United States Patent
Chau et al.

(10) Patent No.: US 9,932,777 B2
(45) Date of Patent: *Apr. 3, 2018

(54) DRILL STRING INGROUND ISOLATOR IN AN MWD SYSTEM AND ASSOCIATED METHOD

(71) Applicant: Merlin Technology, Inc., Kent, WA (US)

(72) Inventors: Albert W. Chau, Woodinville, WA (US); Kenneth J. Theimer, Auburn, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,668

(22) Filed: Oct. 27, 2016

(65) Prior Publication Data

US 2017/0044841 A1    Feb. 16, 2017

Related U.S. Application Data

(63) Continuation of application No. 14/629,269, filed on Feb. 23, 2015, now Pat. No. 9,500,041, which is a
(Continued)

(51) Int. Cl.
*G01V 3/10* (2006.01)
*E21B 17/02* (2006.01)
(Continued)

(52) U.S. Cl.
CPC ............ *E21B 17/028* (2013.01); *E21B 7/028* (2013.01); *E21B 17/003* (2013.01); *E21B 47/00* (2013.01);
(Continued)

(58) Field of Classification Search
CPC ...... E21B 47/122; E21B 47/00; E21B 47/022; E21B 17/003; E21B 44/00; E21B 45/00;
(Continued)

(56) References Cited

U.S. PATENT DOCUMENTS

| 2,354,887 | A | 8/1944 | Silverman et al. |
| 4,348,672 | A | 9/1982 | Givler |

(Continued)

FOREIGN PATENT DOCUMENTS

| CA | 2778434 A1 | 4/2011 |
| GB | 2076039 A | 11/1981 |

(Continued)

OTHER PUBLICATIONS

Extended European Search Report for European Application No. 14773317.4 which is associated with International Application No. PCT/US2014/022861 which is associated with U.S. Appl. No. 13/827,945, dated Oct. 7, 2016, Munich, Germany.
(Continued)

*Primary Examiner* — George Bugg
*Assistant Examiner* — Munear Akki
(74) *Attorney, Agent, or Firm* — Pritzkau Patent Group, LLC

(57) ABSTRACT

An inground isolator and associated method can provide an electrically isolated break in a drill string using electrical insulating members/isolators that are supported by a housing. During drill string operations, the isolators are subject only compressive forces responsive to both extension (pushing) and retraction (pulling) by the drill string. The isolators can be formed from an electrically insulating material such as a ceramic material. An interchangeable inground tool system is described which integrally serves to provide an electrically isolating gap in the drill string.

20 Claims, 17 Drawing Sheets

Related U.S. Application Data continuation of application No. 13/593,439, filed on Aug. 23, 2012, now Pat. No. 9,000,940.

(51) Int. Cl.

| | | |
|---|---|---|
| *G01V 3/34* | (2006.01) | |
| *E21B 47/00* | (2012.01) | |
| *E21B 17/00* | (2006.01) | |
| *E21B 7/02* | (2006.01) | |
| *E21B 47/024* | (2006.01) | |
| *E21B 47/12* | (2012.01) | |

(52) U.S. Cl.
CPC .............. *G01V 3/34* (2013.01); *E21B 47/024* (2013.01); *E21B 47/122* (2013.01)

(58) Field of Classification Search
CPC ......... E21B 47/02216; E21B 47/02224; E21B 47/04; H01Q 1/04; H01Q 1/36; H01Q 1/38; H01Q 21/205; G01V 3/30
USPC ...................... 340/854.4; 175/40, 45; 702/9; 73/152.01–152.44
See application file for complete search history.

(56) References Cited

U.S. PATENT DOCUMENTS

| | | | |
|---|---|---|---|
| 4,496,203 A | 1/1985 | Meadows | |
| 4,578,675 A | 3/1986 | MacLeod | |
| 4,605,268 A | 8/1986 | Meador | |
| 4,864,293 A | 9/1989 | Chau | |
| 4,928,760 A | 5/1990 | Freitas | |
| 5,138,313 A | 8/1992 | Barrington | |
| 5,159,978 A | 11/1992 | Tomek et al. | |
| 5,251,708 A | 10/1993 | Perry et al. | |
| 5,816,344 A | 10/1998 | Turner | |
| 5,869,968 A | 2/1999 | Brooks et al. | |
| 5,961,252 A | 10/1999 | Mercer et al. | |
| 6,035,951 A * | 3/2000 | Mercer | E21B 47/02216 175/45 |
| 6,100,696 A | 8/2000 | Sinclair | |
| 6,134,892 A | 10/2000 | Turner et al. | |
| 6,367,564 B1 | 4/2002 | Mills et al. | |
| 6,389,360 B1 * | 5/2002 | Alft | E21B 7/04 702/9 |
| 6,404,350 B1 | 6/2002 | Soulier | |
| 6,445,307 B1 | 9/2002 | Rassi et al. | |
| 6,484,818 B2 | 11/2002 | Alft et al. | |
| 6,496,008 B1 | 12/2002 | Brune et al. | |
| 6,581,680 B1 | 6/2003 | Wentworth | |
| 6,866,306 B2 * | 3/2005 | Boyle | E21B 17/028 166/66.5 |
| 6,899,178 B2 | 5/2005 | Tubel | |
| 7,012,432 B2 | 3/2006 | Allan | |
| 7,064,676 B2 | 6/2006 | Hall et al. | |
| 7,150,329 B2 | 12/2006 | Chau | |
| 7,170,423 B2 | 1/2007 | Wisler et al. | |
| 7,362,235 B1 | 4/2008 | Normann | |
| 7,490,428 B2 * | 2/2009 | Morys | G01V 11/002 166/72 |
| 7,525,315 B2 * | 4/2009 | Fredette | E21B 47/01 324/339 |
| 7,649,474 B1 | 1/2010 | Gard | |
| 7,775,301 B2 | 8/2010 | Brune et al. | |
| 7,777,644 B2 | 8/2010 | Madhavan et al. | |
| 8,695,727 B2 | 4/2014 | Chau et al. | |
| 9,000,940 B2 | 4/2015 | Chau | |
| 2002/0014334 A1* | 2/2002 | Chau | E21B 17/003 166/65.1 |
| 2003/0192692 A1 | 10/2003 | Tubel | |
| 2004/0075577 A1 | 4/2004 | Allan | |
| 2005/0087368 A1 | 4/2005 | Boyle | |
| 2005/0218898 A1 | 10/2005 | Fredette et al. | |
| 2007/0023185 A1 | 2/2007 | Hall et al. | |
| 2007/0029112 A1 | 2/2007 | Li et al. | |
| 2010/0224356 A1 | 9/2010 | Moore | |
| 2011/0311305 A1 | 12/2011 | Cairo et al. | |
| 2012/0085583 A1 | 4/2012 | Logan | |
| 2012/0217023 A1 | 8/2012 | Chau et al. | |
| 2012/0218863 A1 | 8/2012 | Chau et al. | |
| 2013/0043874 A1 | 2/2013 | Clark et al. | |
| 2013/0176139 A1 | 7/2013 | Chau et al. | |
| 2014/0174825 A1 | 6/2014 | Chau et al. | |
| 2014/0262513 A1 | 9/2014 | Chau et al. | |

FOREIGN PATENT DOCUMENTS

| | | |
|---|---|---|
| GB | 2405420 A | 3/2005 |
| GB | 2427218 A | 12/2006 |
| RU | 27839 U1 | 2/2003 |
| RU | 2232888 | 7/2004 |
| RU | 4790 U1 | 9/2005 |
| RU | 65133 U1 | 7/2007 |
| RU | 2351759 C1 | 4/2009 |
| WO | 82/02754 | 8/1982 |
| WO | 84/01439 A1 | 4/1984 |
| WO | 99/08035 | 2/1999 |
| WO | 2009/086637 A1 | 7/2009 |
| WO | 2011/049573 A1 | 4/2011 |
| WO | 2014/031663 A1 | 2/2014 |

OTHER PUBLICATIONS

The International Search Report and the Written Opinion of the International Searching Authority for International Application No. PCT/US2013/055828 which is associated with U.S. Appl. No. 13/593,439, dated Dec. 5, 2013, Moscow, Russia.

The International Search Report and the Written Opinion of the International Searching Authority for International Application No. PCT/2014/022861 which is associated with U.S. Appl. No. 13/827,945, dated Jul. 10, 2014, Moscow, Russia.

The International Search Report and the Written Opinion of the International Searching Authority for International Application No. PCT/US 12/24257 which is associated with U.S. Appl. No. 13/035,774, dated May 17, 2012, Alexandria, Virginia.

The International Search Report and the Written Opinion of the International Searching Authority for International Application No. PCT/US2012/024261 which is associated with U.S. Appl. No. 13/035,833, dated Jun. 12, 2012, Alexandria, Virginia.

Office Action for Chinese Application No. 201280015241.2, which is associated with International Application No. PCT/US2012/024261 which is associated with U.S. Appl. No. 13/035,833, dated Aug. 25, 2015. (Machine translation also included).

Office Action for Chinese Application No. 201280015145.8, which is associated with International Application No. PCT/US2012/024257 which is associated with U.S. Appl. No. 13/035,774, dated Aug. 4, 2015. (Machine translation also included).

International Preliminary Report on Patentability for International Application No. PCT/2014/022861 which is associated with U.S. Appl. No. 13/827,945, dated Feb. 24, 2015, Alexandria, Virginia.

Applicant's Instructions to Foreign Associate for Response to 1$^{st}$ Office Action for Chinese Application No. 201280015241.2, which is associated with International Application No. PCT/US2012/024261 which is associated with U.S. Appl. No. 13/035,833, dated Feb. 14, 2016.

Applicant's Instructions to Foreign Associate for Response to 1$^{st}$ Office Action for Chinese Application No. 201280015145.8, which is associated with International Application No. PCT/US2012/024257 which is associated with U.S. Appl. No. 13/035,774, dated Feb. 17, 2016.

Second Office Action for Chinese Application No. 201280015241.2, which is associated with International Application No. PCT/US2012/024261 which is associated with U.S. Appl. No. 13/035,833, dated Jun. 3, 2016. (Machine translation also included).

Second Office Action for Chinese Application No. 201280015145.8, which is associated with International Application No. PCT/US2012/024257 which is associated with U.S. Appl. No. 13/035,774, dated Jun. 3, 2016.

(56) References Cited

OTHER PUBLICATIONS

Extended European Search Report for European Application No. 13830793.9 which is associated with International Application No. PCT/US2013/055828 which is associated with U.S. Appl. No. 13/593,439, dated Jul. 7, 2016, Munich, Germany.
Third Office Action for Chinese Application No. 201280015145.8, which is associated with International Application No. PCT/US2012/024257 which is associated with U.S. Appl. No. 13/035,774, dated Jan. 4, 2017. (Machine translation included).
Fourth Office Action for Chinese Application No. 201280015145.8, which is associated with International Application No. PCT/US2012/024257 which is associated with U.S. Appl. No. 13/035,774, dated Jul. 5, 2017. (Machine translation included).
First Office Action for Chinese Application No. 201380044134.7, which is associated with International Application No. PCT/US2013/055828 which is associated with U.S. Appl. No. 13/593,439, dated Apr. 24, 2017. (Machine translation included).
First Office Action of the Russian Federation for Russian Application No. 2015138903 which is associated with International Application No. PCT/US2014/022861 which is associated with U.S. Appl. No. 13/827,945, dated Mar. 14, 2017.
Extended European Search Report for European Application No. 12748918.5 which is associated with International Application No. PCT/US2012/024257 which is associated with U.S. Appl. No. 13/035,774, dated Oct. 24, 2017, Munich, Germany.
First Office Action for Chinese Application No. 201480015049.2, which is associated with International Application No. PCT/US2014/022861 which is associated with U.S. Appl. No. 13/827,945, dated Oct. 23, 2017. (Machine translation included).

\* cited by examiner

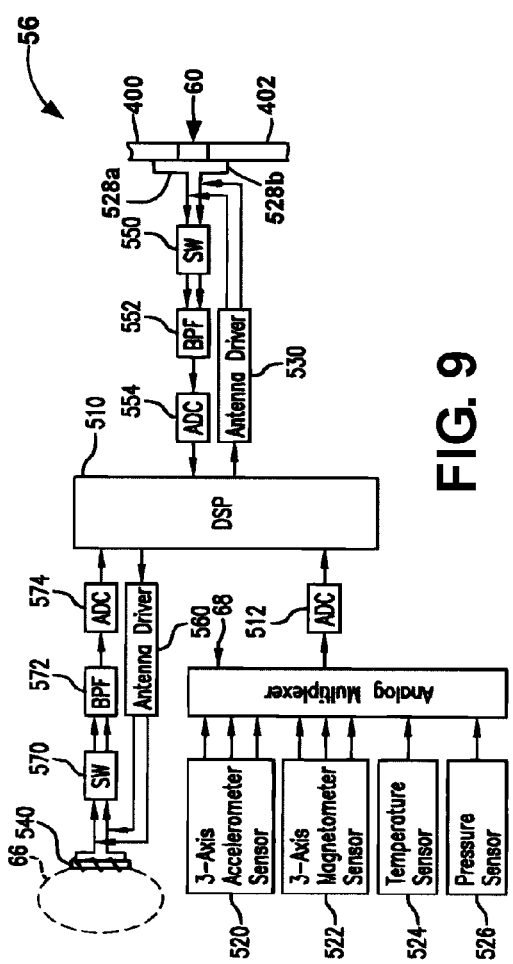
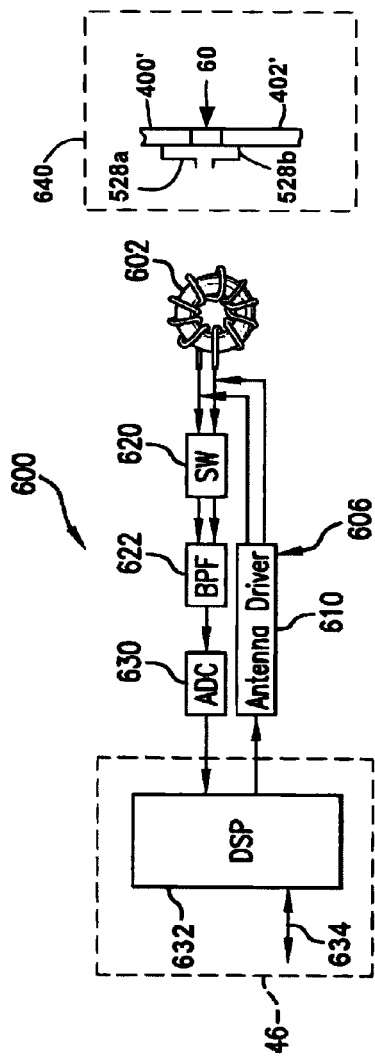
FIG. 9
FIG. 10

DRILL STRING INGROUND ISOLATOR IN AN MWD SYSTEM AND ASSOCIATED METHOD

RELATED APPLICATION

This application is a continuation application of copending U.S. patent application Ser. No. 14/629,269 filed on Feb. 23, 2015, which is a continuation application of U.S. patent application Ser. No. 13/593,439 filed on Aug. 23, 2012 and issued as U.S. Pat. No. 9,000,940 on Apr. 7, 2015, the disclosures of which are incorporated herein by reference.

BACKGROUND

The present application is generally related to inground operations and, more particularly, to a system, apparatus and method for electrically coupling an electrical signal onto an electrically conductive drill string for purposes of transferring the signal.

Generally, an inground operation such as, for example, drilling to form a borehole, subsequent reaming of a borehole for purposes of installing a utility line, borehole mapping and the like use an electrically conductive drill string which extends from an above ground drill rig. The prior art includes examples of the use of an electrically conductive drill string as an electrical conductor for serving to electrically conduct a data signal from an inground tool to the drill rig. The surrounding earth itself serves as a signal return path for purposes of detecting the signal at the drill rig. This type of system is often referred to as a Measurement While Drilling, MWD, system.

An example of an attempt to use the drill string as an electrical conductor in an MWD system is seen, for example, in U.S. Pat. No. 4,864,293 (hereinafter, the '293 patent). In one embodiment, the patent teaches an electrically isolated collar that is fitted around the drill string. Applicants recognize that the use of such an electrically isolated collar (FIG. 2, item 32) is problematic at least with respect to durability in what can be an extremely hostile inground environment. In another embodiment, shown in FIGS. 3 and 4, a suitable dielectric separator 40 is diagrammatically shown and asserted to electrically isolate a front section of the drill string from the remainder of the drill string. No detail is provided that would reasonably teach one how to fabricate this separator, but it is reasonable to assume that the isolator would simply be inserted into a break in the drill string for co-rotation therewith. Unfortunately, the isolator would then be subject to the same rigorous mechanical stresses during the drilling operation as the drill pipe sections of the drill string including pure tension force during pullback operations and high shear forces due to rotational torque that is applied to the drill string by the drill rig. While the drill string is generally formed from high strength steel that can readily endure these forces, Applicants are unaware of any currently available non electrically conductive material that is capable of enduring all these different forces with a reliability that Applicants consider as acceptable. It should be appreciated that the consequences of breaking off the end of the drill string during a drilling operation are extremely severe. Thus, the risk introduced through the use of an isolator in the suggested manner is submitted to be unacceptable.

An even earlier approach is seen in U.S. Pat. No. 4,348,672 in which an attempt is made to introduce an electrically isolating break in the drill string using various layers of dielectric material that are interposed between the components of what the patent refers to as an "insulated gap sub assembly" that is made up of first and second annular sub members. One embodiment is illustrated by FIGS. 5 and 6 while another embodiment is illustrated by FIGS. 7 and 8 of the patent. Unfortunately, the practice of interposing relatively thin dielectric layers in a gap defined between adjacent high-strength metal components, that are competent to withstand extreme forces as well as a hostile downhole environment, is unlikely to provide an acceptable level of performance. In particular, these dielectric layers are subjected to the same severe forces as the first and second annular sub members such that durability in a hostile downhole environment is most likely to be limited. That is, the desired electrical isolation will be compromised at the moment that one of the relatively thin dielectric layers is worn through.

Practical approaches with respect to coupling an electrical signal onto a drill string in the context of an MWD system are seen, for example, in U.S. patent application Ser. No. 13/035,774 (hereinafter the '774 application) and U.S. patent application Ser. No. 13/035,833 (hereinafter, the '833 application), each of which is commonly owned with the present application and each of which is incorporated herein by reference in its entirety. The latter applications take the highly effective approach of using a downhole current transformer to inductively couple a downhole signal onto the drill string while still maintaining physical performance characteristics that are comparable to those of the drill string itself. While the '774 and '833 applications provided sweeping advantages over the then-existing state of the art, Applicants have discovered other highly advantageous approaches, as will be described hereinafter.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the disclosure, an apparatus and associated method are disclosed for use in combination with a drill string that is electrically conductive and extends from an inground distal end, that includes an inground tool, to a drill rig. In an embodiment, the apparatus includes a first group of electrical isolators and a second group of electrical isolators. A housing defines a through passage and includes a length that is configured to support the first group and the second group in a spaced apart relationship along said length and surrounding the through passage such that, responsive to the drill rig pushing on the drill string, a first one of the first and second groups is subject to a first compressive force and responsive to the drill rig pulling on the drill string the other one of the first and second groups is subject to a second compressive force without subjecting either of the first and second groups to a tension force during said pushing and pulling by the drill rig to form an electrically isolating break in the drill string. In one feature, responsive to the drill rig pushing on the drill string, a first one of the first and second groups is subject to the first compressive force without subjecting the second group to the first compressive force and, responsive to the drill rig pulling on the drill string, a second one of the first and second groups is subject to the second compressive force without subjecting the other one of the first and second groups to the second compressive force.

In another aspect of the disclosure, an apparatus and associated method are described for use in combination with a drill string that is electrically conductive and extends from an inground distal end, that includes an inground tool, to a drill rig. The drill rig is configured to rotate the drill string which applies a rotational torque to the drill string. A housing is configured to support a group of electrical isolators to electrically isolate a downhole portion of the drill string from an uphole portion of the drill string such that the group of electrical isolators is subject only to a compressive force responsive to the rotational torque.

In still another aspect of the present disclosure, an apparatus and associated method are described for use in combination with an electrically conductive drill string and which drill string extends from an inground distal end, including an inground tool, to a drill rig. A plurality of electrical isolators is provided. A housing an elongated housing length that is configured to support the plurality of electrical isolators under a compressive preload that is applied by the housing in a direction that is aligned with the elongated housing length such that an overall compressive force that is applied to the electrical isolators varies responsive to push and pull forces that are applied to the drill string by the drill rig and the electrical isolators cooperate with the housing to form an electrically isolating gap between the inground distal end and the drill rig.

In a continuing aspect of the present disclosure, an apparatus and associated method are described for use in combination with a drill string that is electrically conductive and extends from an inground distal end that includes an inground tool, to a drill rig. A first group of electrical isolators and a second group of electrical isolators are provided. A first housing body is electrically conductive and defines a first drill string fitting. A second housing body is also electrically conductive and includes opposing first and second ends. The second housing body is configured to cooperate with the first housing body to support the first group of electrical isolators at the first end of the second housing body and the second group of electrical isolators at the second end of the second housing body such that the first housing body is electrically isolated from the second housing body. An interchangeable body, that is electrically conductive, is configured for removably fixed engagement with the second end of the second housing body. The interchangeable body is selectable as each of (i) the inground tool to form the inground distal end of the drill string and (ii) a second, opposing drill string fitting such that the apparatus is insertable into a joint in the drill string that would otherwise be formed between adjacent drill rods as the drill string is extended.

BRIEF DESCRIPTIONS OF THE DRAWINGS

Exemplary embodiments are illustrated in referenced figures of the drawings. It is intended that the embodiments and figures disclosed herein are to be illustrative rather than limiting.

FIG. 9 is a block diagram of an embodiment of a downhole electronics section that is suitable for use with an embodiment of the inground isolator of the present disclosure.

FIG. 10 is a block diagram of an embodiment of an uphole electronics section that is suitable for use at the drill rig for bidirectional communication with a downhole electronics section via the isolator of the present disclosure and further including an inset view which illustrates a repeater embodiment of the isolator of the present disclosure and associated electrical connections which transform the electronics section for downhole repeater use.

Figure 11:
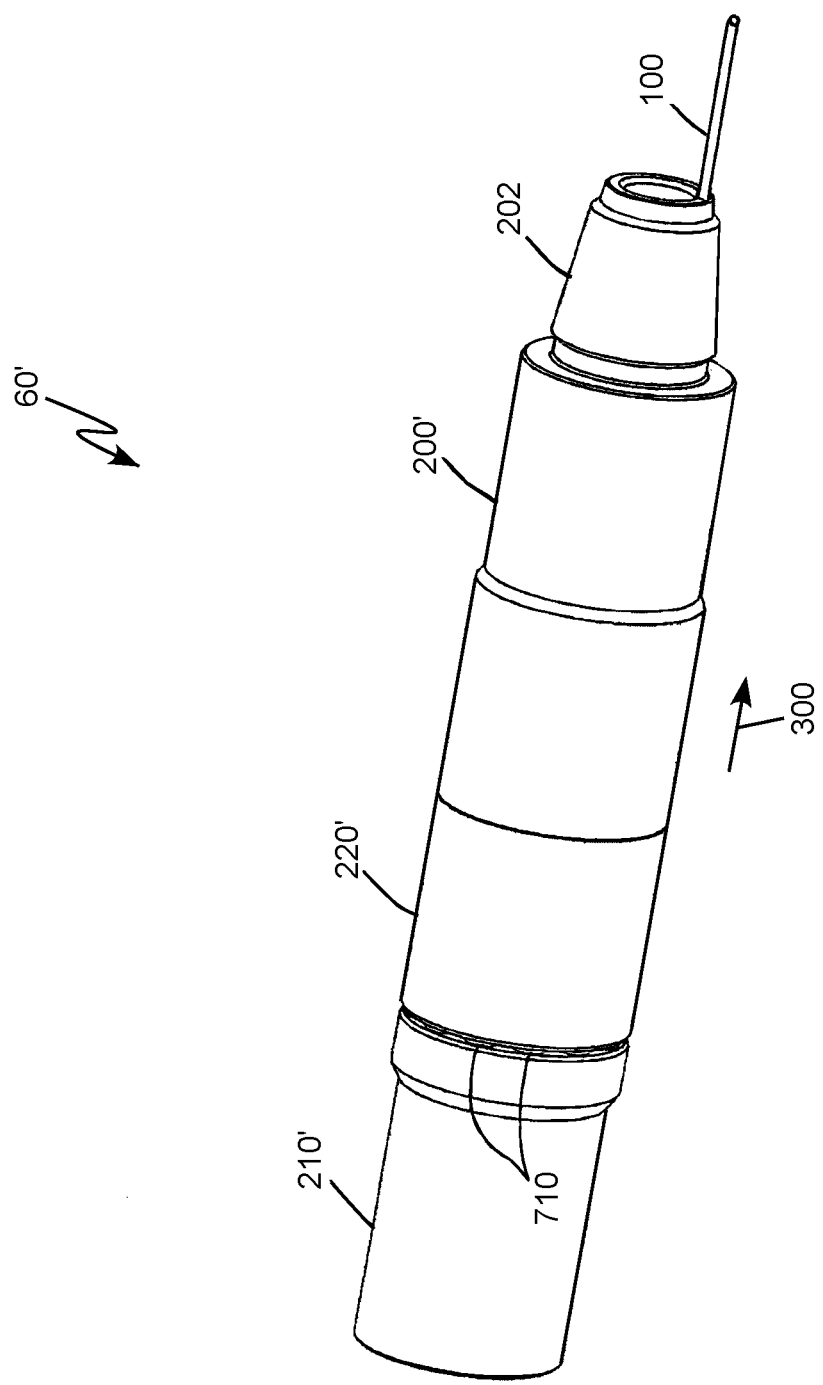

FIG. 11 is a diagrammatic assembled view, in perspective, showing another embodiment of an inground isolator according to the present disclosure.

Figure 12:
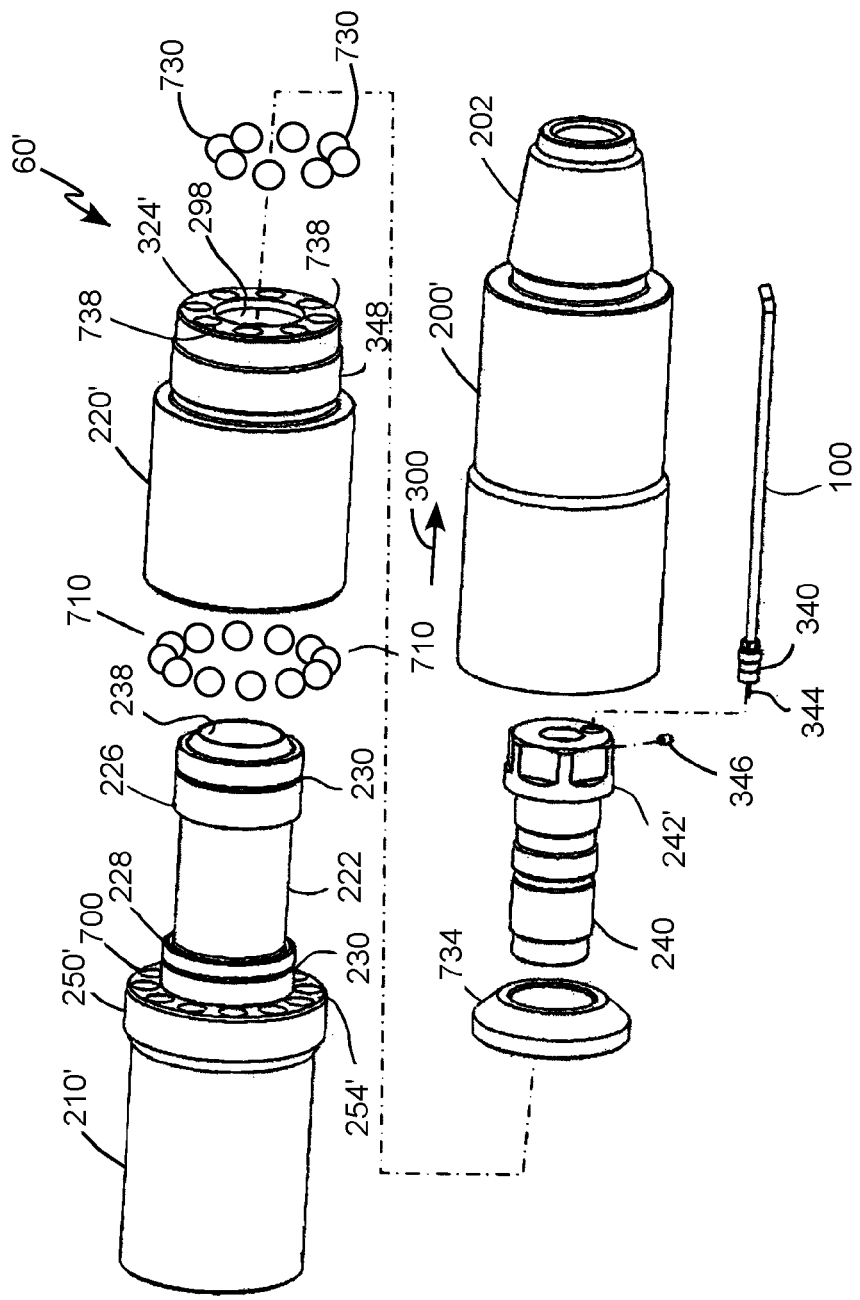

FIG. 12 is a diagrammatic, exploded perspective view of the embodiment of the isolator of FIG. 11.

Figure 13:
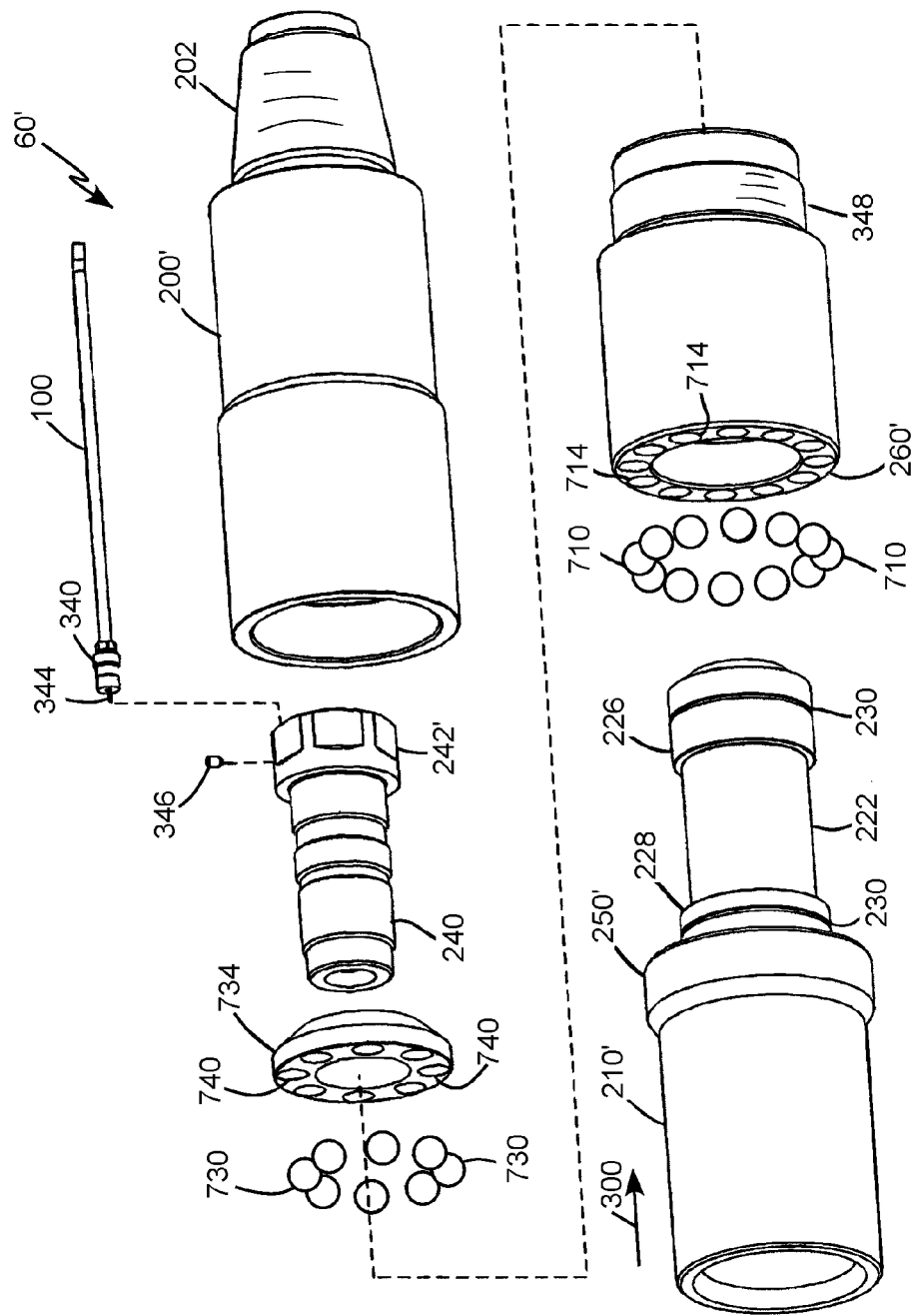

FIG. 13 is another diagrammatic, exploded perspective view of the embodiment of the isolator of FIG. 11.

Figure 14:
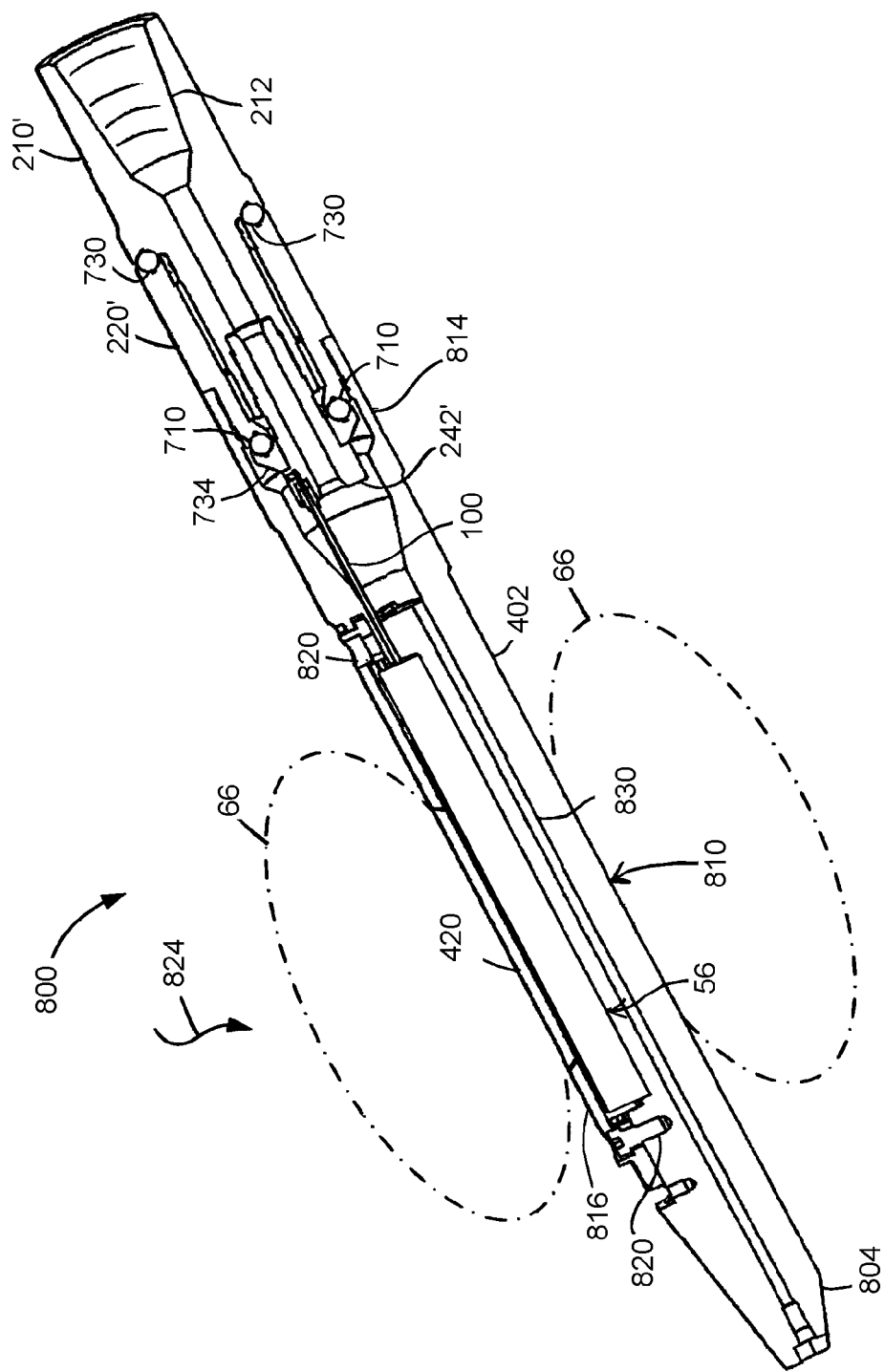

FIG. 14 is a cut-away diagrammatic perspective view of an embodiment of an inground tool according to the present disclosure which integrally provides an inground isolator configuration according to the present disclosure.

Figure 15:
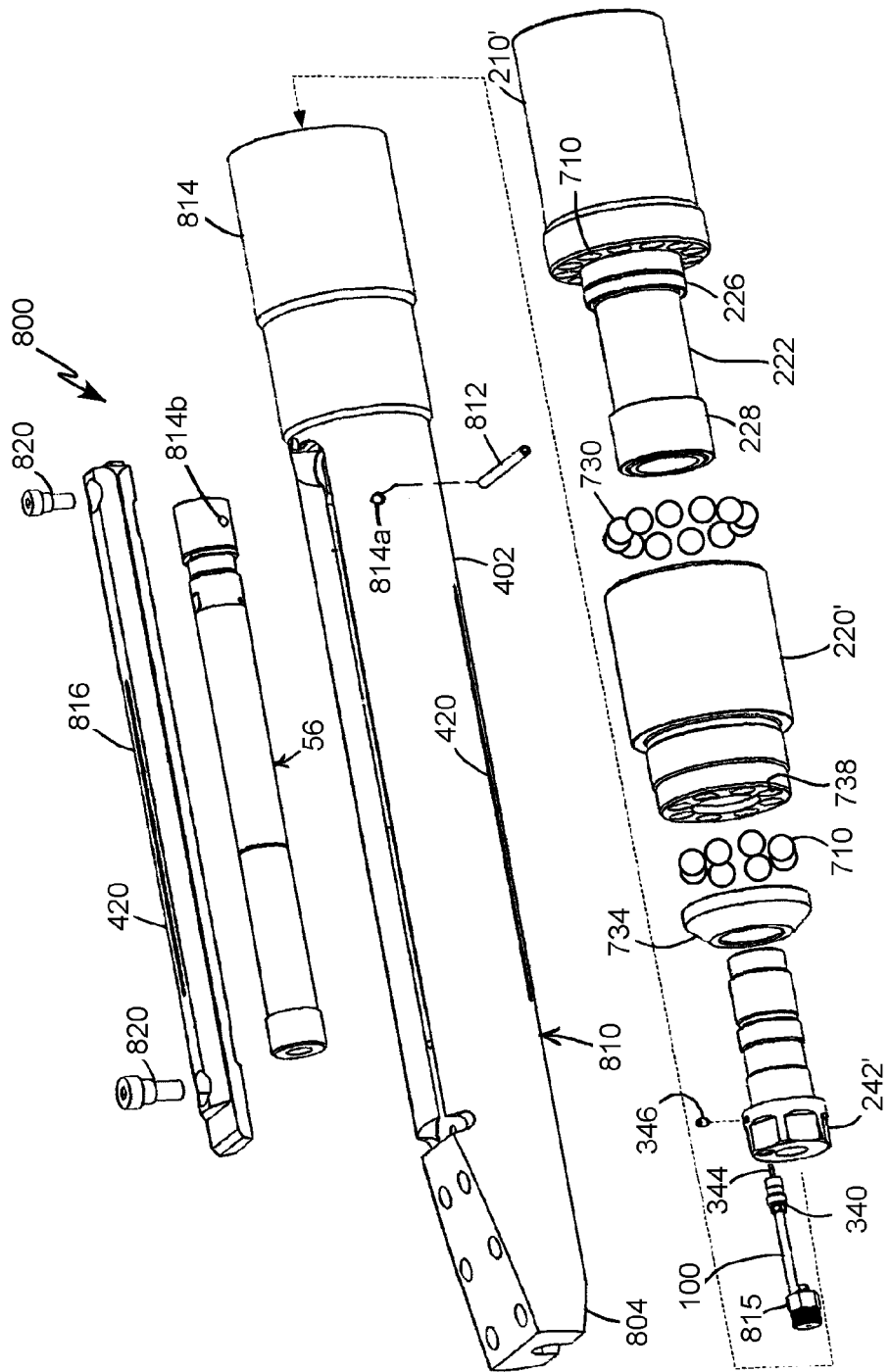
Figure 16:
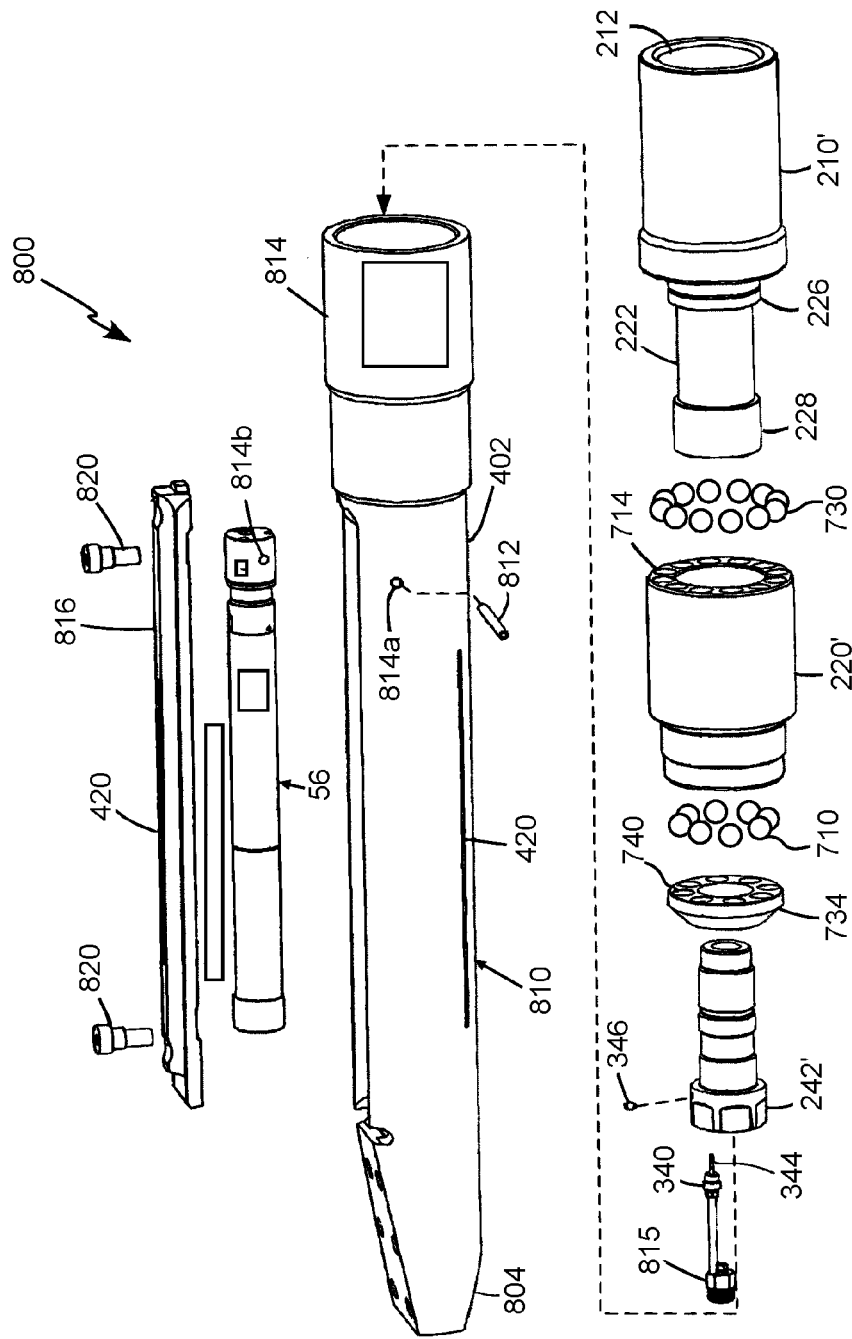

FIGS. 15 and 16 are diagrammatic exploded views, taken from different perspectives, of the inground tool of FIG. 14, shown here to illustrate details of its structure.

Figure 17:
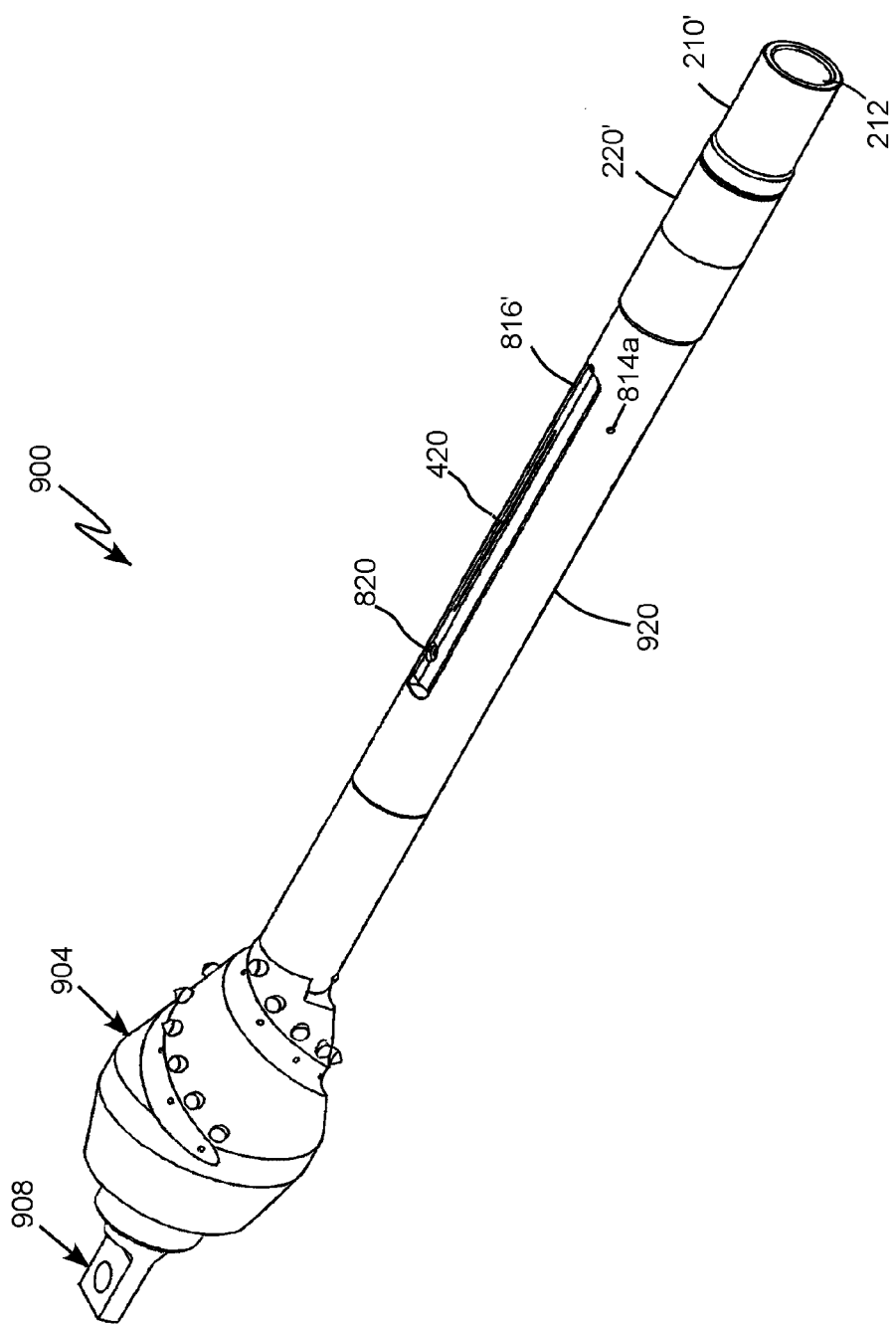

FIG. 17 is a diagrammatic view, in perspective, of an embodiment of an inground tool system and associated components in accordance with the present disclosure wherein the inground tool is interchangeable among a variety of different tools that are directed to different types of inground operations.

Figure 18:
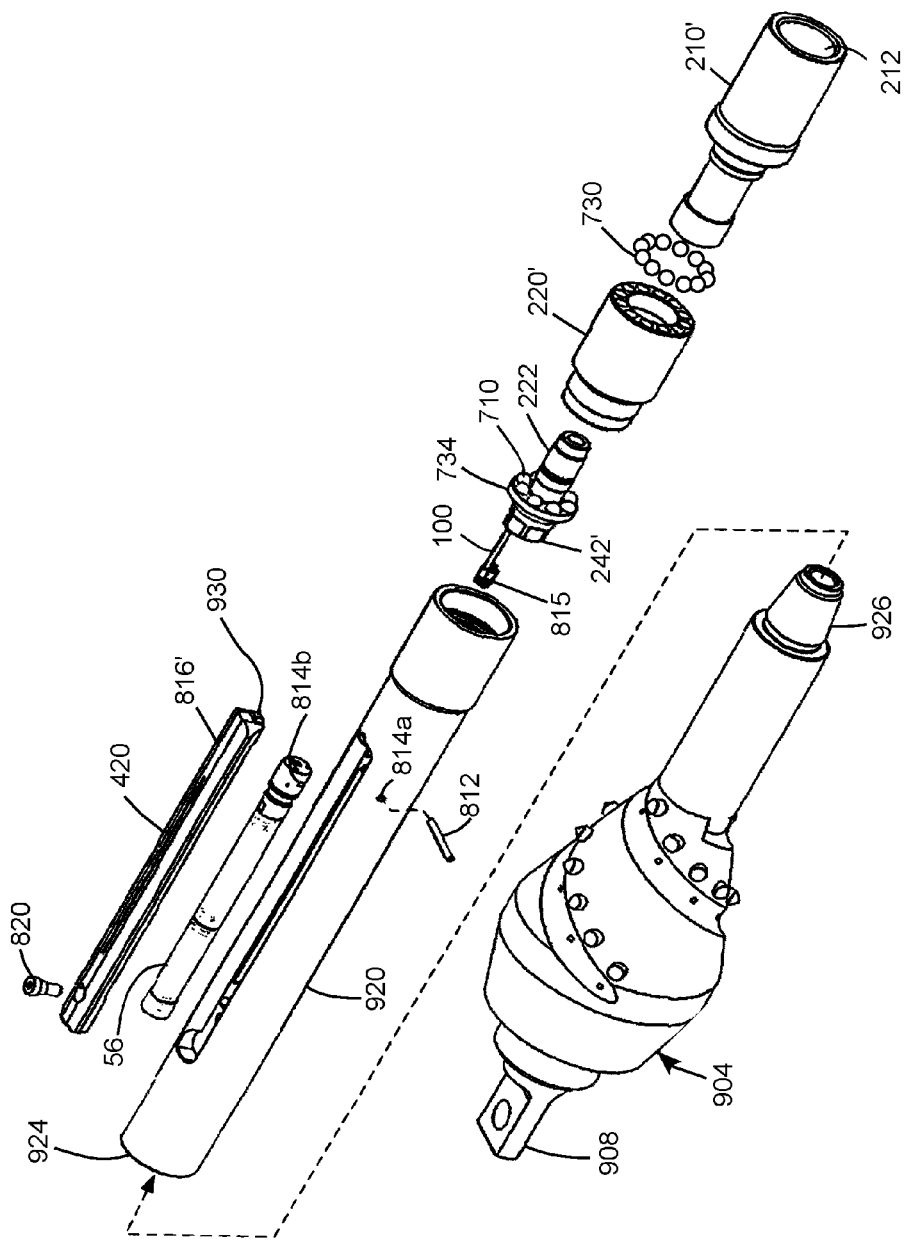

FIG. 18 is an exploded diagrammatic view, in perspective, of the inground tool system of FIG. 17, shown here to illustrate details of its internal structure.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be used with respect to these descriptions, however, this terminology has been adopted with the intent of facilitating the reader's understanding and is not intended as being limiting.

Figure 1:
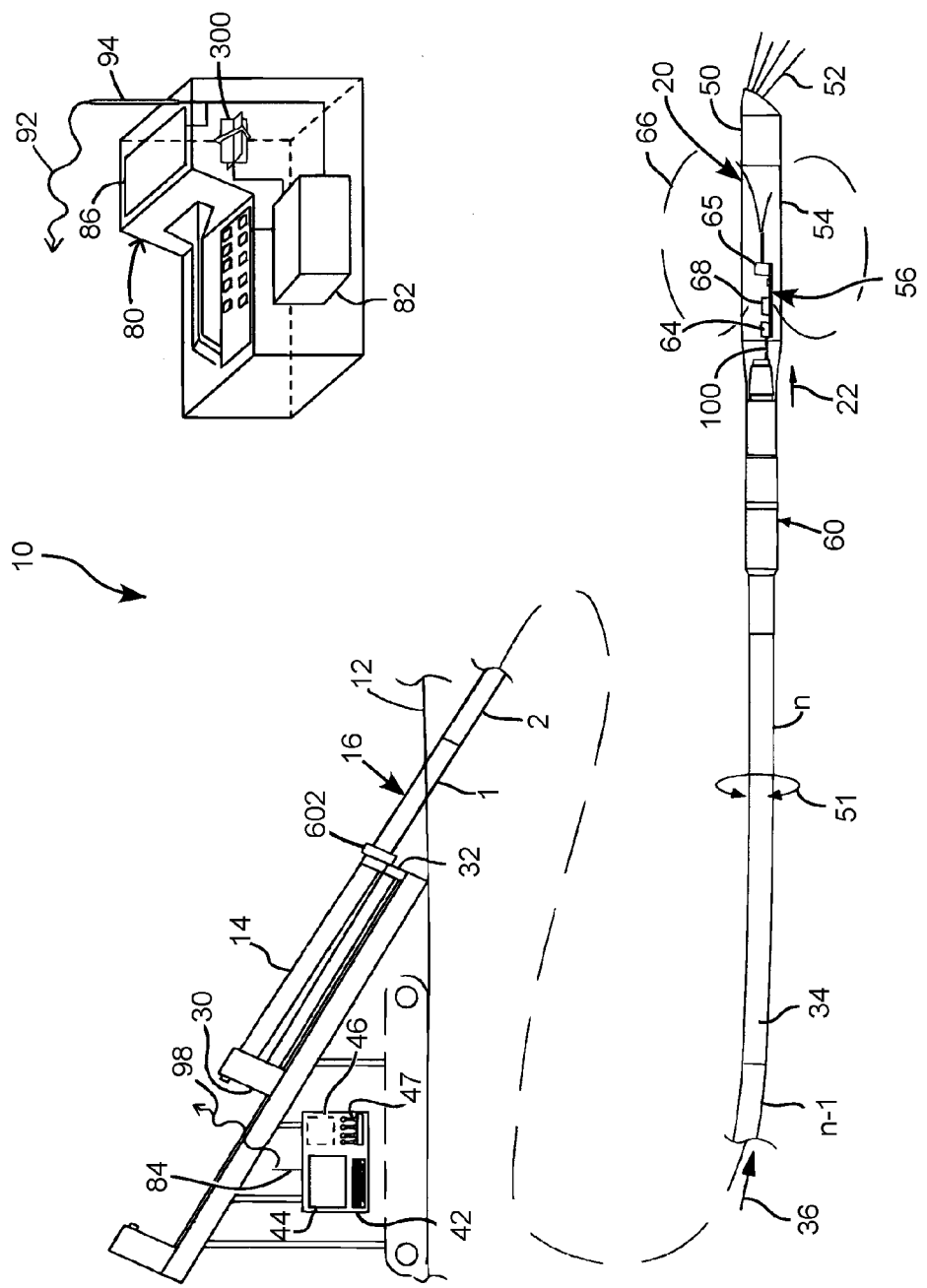
FIG. 1 is a diagrammatic view, in elevation, of a system which utilizes an embodiment of an inground isolator and inground signal coupling method of the present disclosure.

Turning now to the figures wherein like components are indicated by like reference numbers throughout the various figures, attention is immediately directed to FIG. 1 which is an elevational view that diagrammatically illustrates an embodiment of a horizontal directional drilling system generally indicated by the reference number 10 and produced in accordance with the present disclosure. While the illustrated system shows the invention within the framework of a horizontal directional drilling system and its components for performing an inground boring operation, the invention enjoys equal applicability with respect to other operational procedures including, but not limited to vertical drilling operations, pullback operations for installing utilities, mapping operations and the like.

FIG. 1 illustrates system 10 operating in a region 12. System 10 includes a drill rig 14 having a drill string 16 extending therefrom to an inground tool 20. The drill string can be pushed into the ground to move inground tool 20 at least generally in a forward direction 22 indicated by an arrow. While the present example is framed in terms of the use of a boring tool as the inground tool and may be referred to as such, it should be appreciated that the discussions apply to any suitable form of inground tool including but not limited to a reaming tool, a tension monitoring tool for use during a pullback operation in which a utility or casing can be installed, a mapping tool for use in mapping the path of the borehole, for example, using an inertial guidance unit and downhole pressure monitoring. In the operation of a boring tool, it is generally desirable to monitor based on the advance of the drill string whereas in other operations such as a pullback operation, monitoring can be performed responsive to retraction of the drill string.

With continuing reference to FIG. 1, drill string 16 is partially shown and is segmented, being made up of a plurality of removably attachable, individual drill pipe sections some of which are indicated as 1, 2, n−1 and n, having a section or segment length and a wall thickness. The drill pipe sections may be referred to interchangeably as drill rods having a rod length. During operation of the drill rig, one drill pipe section at a time can be added to the drill string and pushed into the ground by the drill rig using a movable carriage 30 in order to advance the inground tool. Drill rig 14 can include a suitable monitoring arrangement 32 for measuring movement of the drill string into the ground such as is described, for example, in U.S. Pat. No. 6,035,951 (hereinafter the '951 patent), entitled SYSTEMS, ARRANGEMENTS AND ASSOCIATED METHODS FOR TRACKING AND/OR GUIDING AN UNDERGROUND BORING TOOL, which is commonly owned with the present application and hereby incorporated by reference.

Each drill pipe section defines a through opening 34 (one of which is indicated) extending between opposing ends of the pipe section. The drill pipe sections can be fitted with what are commonly referred to as box and pin fittings such that each end of a given drill pipe section can threadingly engage an adjacent end of another drill pipe section in the drill string in a well known manner. Once the drill pipe sections are engaged to make up the drill string, the through openings of adjacent ones of the drill pipe sections align to form an overall pathway 36 that is indicated by an arrow. Pathway 36 can provide for a pressurized flow of drilling fluid or mud, consistent with the direction of arrow 36, from the drill rig to the drill head, as will be further described.

The location of the boring tool within region 12 as well as the underground path followed by the boring tool may be established and displayed at drill rig 14, for example, on a console 42 using a display 44. The console can include a processing arrangement 46 and a control actuator arrangement 47. In some embodiments, control and monitoring of operational parameters can be automated.

Boring tool 20 can include a drill head 50 having an angled face for use in steering based on roll orientation. That is, the drill head when pushed ahead without rotation will generally be deflected on the basis of the roll orientation of its angled face. On the other hand, the drill head can generally be caused to travel in a straight line by rotating the drill string as it is pushed, as indicated by a double-headed arrow 51. Of course, predictable steering is premised upon suitable soil conditions. It is noted that the aforementioned drilling fluid can be emitted as jets 52 under high pressure for purposes of cutting through the ground immediately in front of the drill head as well as providing for cooling and lubrication of the drill head. Boring tool 20 includes an inground housing 54 that receives an electronics package 56. The inground housing is configured to provide for the flow of drilling fluid to drill head 50 around the electronics package. For example, the electronics package can include a cylindrical housing configuration that is supported in a centered manner within housing 54. Drill head 50 can include a box fitting that receives a pin fitting of inground housing 54. An opposing end of the inground housing can include a box fitting that receives a pin fitting of an isolator 60. An opposing end of isolator 60 can include a box fitting that receives a pin fitting. For purposes of the discussions herein and the appended claims, the isolator and boring tool can be considered as part of the drill string so as to define a distal, inground end of the drill string. It is noted that the box and pin fittings of the drill head, the inground housing and the isolator can be the same box and pin fittings as those found on the drill pipe sections of the drill string for facilitating removable attachment of the drill pipe sections to one another in forming the drill string. Inground electronics package 56 can include a drill string transceiver 64 and a locating transceiver 65. Further details with respect to the drill string transceiver will be provided at appropriate points hereinafter. Locating transceiver 65, in some embodiments, can transmit a ground penetrating signal 66 such as, for example, a dipole locating signal and can receive an electromagnetic signal that is generated by other inground components as will be described at an appropriate point below. In other embodiments, transceiver 65 can be replaced by a transmitter or may not be needed. The present example assumes that electromagnetic signal 66 is a locating signal in the form of a dipole signal for descriptive purposes. Accordingly, electromagnetic signal 66 may be referred to as a locating signal. It should be appreciated that the locating signal can be modulated like any other electromagnetic signal and that the modulation data is thereafter recoverable from the signal. The locating functionality of the signal depends, at least in part, on the characteristic shape of the flux field and its signal strength rather than its ability to carry modulation. Thus, modulation is not required. Information regarding certain parameters of the boring tool such as, for example, pitch and roll (orientation parameters), temperature, drilling fluid pressure and annular pressure surrounding the boring tool can be measured by a suitable sensor arrangement 68 located within the boring tool which may include, for example, a pitch sensor, a roll sensor, a temperature sensor, an AC field sensor for sensing proximity of 50/60 Hz utility lines and any other sensors that are desired such as, for example, a DC magnetic field sensor for sensing yaw orientation (a tri-axial magnetometer, with a three axis accelerometer to form a electronic compass to measure yaw orientation) and one or more pressure sensors. Drill string transceiver 64 can include a processor that is interfaced as necessary with sensor arrangement 68 and locating transceiver 65. In some embodiments, one or more accelerometers can be used to measure orientation parameters such as pitch and roll orientation. A battery (not shown) can be provided within the housing for providing electrical power.

A portable locator 80 can be used to detect electromagnetic signal 66. One suitable and highly advanced portable locater is described in U.S. Pat. No. 6,496,008, entitled FLUX PLANE LOCATING IN AN UNDERGROUND DRILLING SYSTEM, which is commonly owned with the present application and is incorporated herein by reference in its entirety. As mentioned above, the present descriptions apply to a variety of inground operations and are not intended as being limiting, although the framework of horizontal directional drilling has been employed for descriptive purposes. As discussed above, electromagnetic signal 66 can carry information including orientation parameters such as, for example, pitch and roll. Other information can also be carried by the electromagnetic signal. Such information can include, by way of example, parameters that can be measured proximate to or internal to the boring tool including temperatures, pressures and voltages such as a battery or power supply voltage. Locator 80 includes an electronics package 82. It is noted that the electronics package is interfaced for electrical communication with the various components of the locator and can perform data processing. Information of interest can be modulated on electromagnetic signal 66 in any suitable manner and transmitted to locator 80 and/or an antenna 84 at the drill rig, although this is not required. Any suitable form of modulation may be used either currently available or yet to be developed. Examples of currently available and suitable types of modulation include amplitude modulation, frequency modulation, phase modulation and variants thereof. Any parameter of interest in relation to drilling such as, for example, pitch may be displayed on display 44 and/or on a display 86 of locator 80 as recovered from the locating signal. Drill rig 14 can transmit a telemetry signal 98 that can be received by locator 80. The telemetry components provide for bidirectional signaling between the drill rig and locator 80. As one example of such signaling, based on status provided by drill rig monitoring unit 32, the drill rig can transmit an indication that the drill string is in a stationary state because a drill pipe section is being added to or removed from the drill string.

Still referring to FIG. 1, an electrical cable 100 can extend from inground electronics package 56 such that any sensed value or parameter relating to the operation of the inground tool can be electrically transmitted on this cable. One of ordinary skill in the art will appreciate that what is commonly referred to as a "wire-in-pipe" can be used to transfer signals to the drill rig. The term wire-in-pipe refers to an electrical cable that is generally housed within interior passageway 36 that is formed by the drill string. In accordance with the present disclosure, however, cable 100 extends to inground isolator 60, as will be further described.

Figure 2:
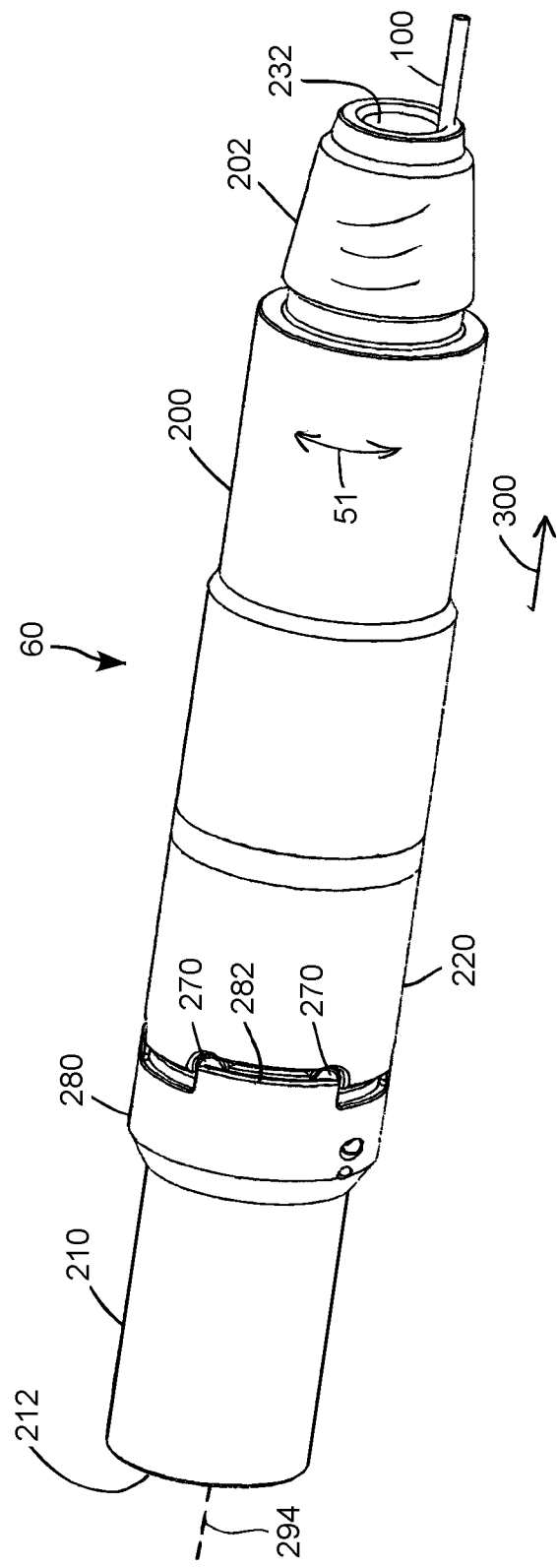
FIG. 2 is a diagrammatic view, in perspective, which illustrates an embodiment of the isolator of the present disclosure in an assembled form.

Attention is now directed to FIG. 2 in conjunction with FIG. 1. FIG. 2 is a diagrammatic perspective view which illustrates an embodiment of isolator 60 in its assembled form. The assembly includes a pin end housing 200 having a pin fitting 202 defining a through passage from which cable 100 can extend for external electrical connection. A box end housing 210 defines a box fitting 212. As discussed above, pin fitting 202 and box fitting 212 can match the fittings on drill pipe sections that make up drill string 16 such that the isolator can be inserted in any desired joint in the drill string. As will be seen, the isolator provides electrical isolation of the pin end housing from the box end housing.

Figure 3:
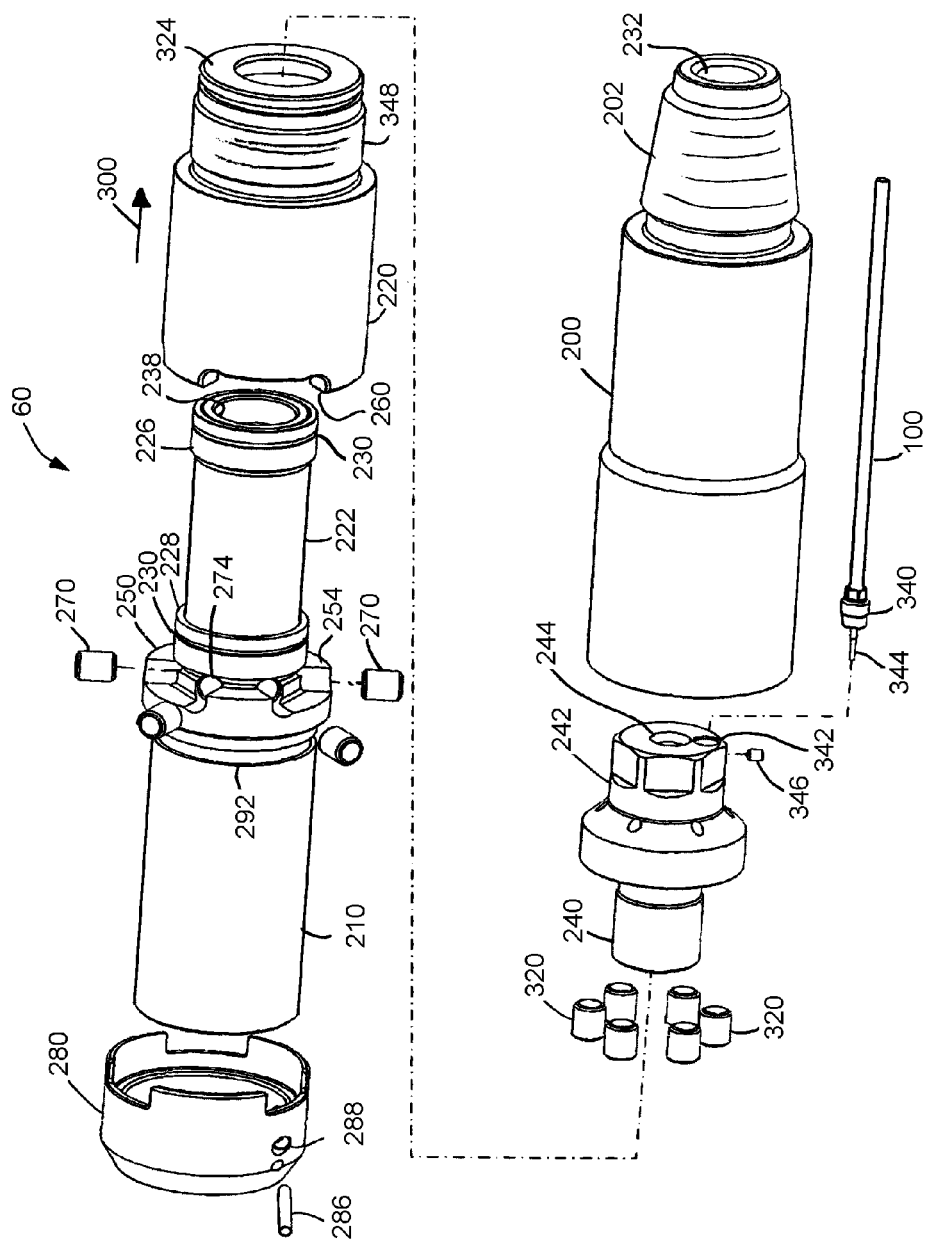
FIG. 3 is a diagrammatic, exploded perspective view of the embodiment of the isolator of FIG. 2.
Figure 4:
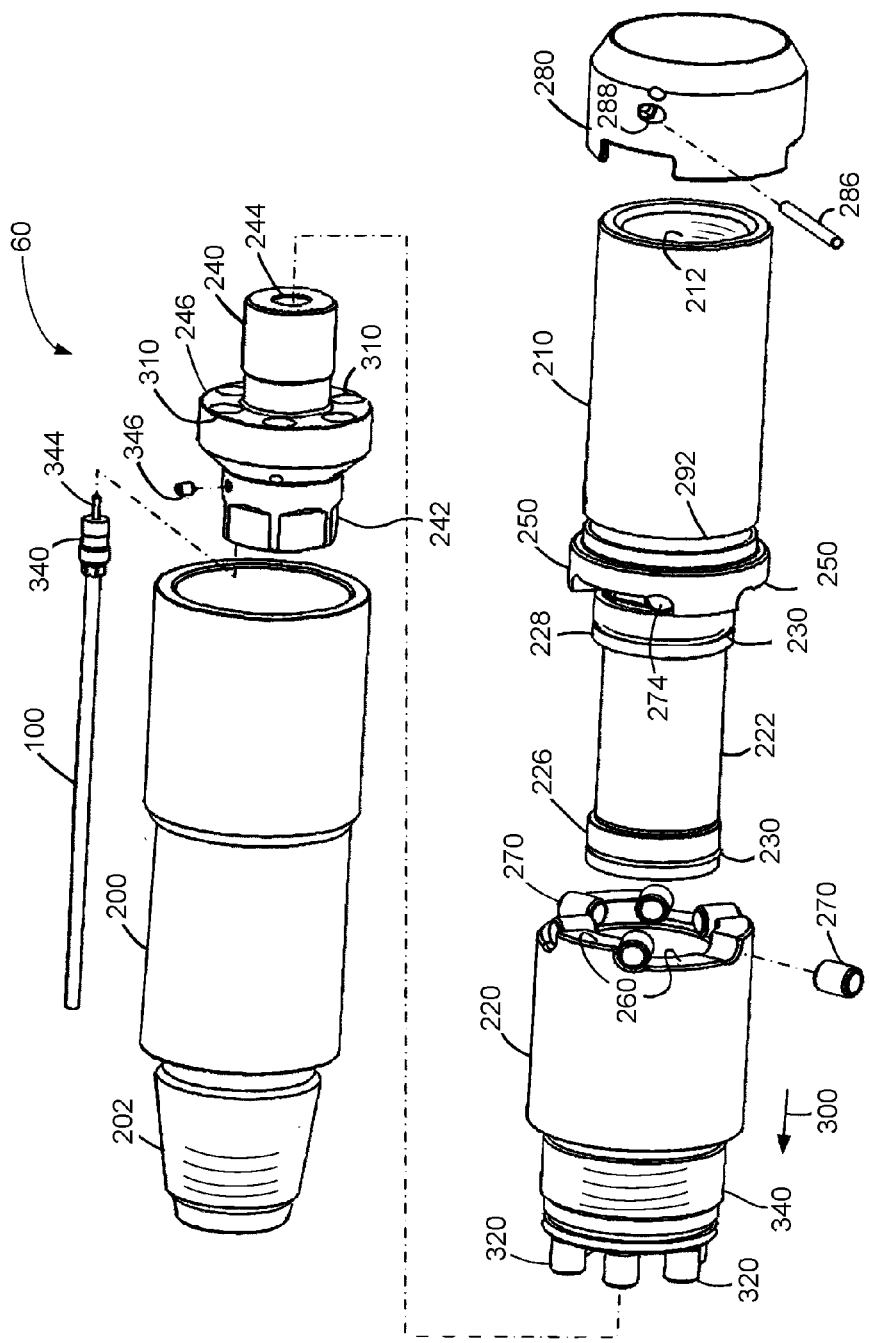
FIG. 4 is another diagrammatic, exploded perspective view of the embodiment of the isolator of FIG. 2.

Attention is now directed to FIGS. 3 and 4, in conjunction with FIG. 2. FIG. 3 is a diagrammatic exploded view of isolator 60 as seen from pin housing end 200, while FIG. 4 is a diagrammatic exploded view of the isolator as seen from box housing end 210. It should be appreciated that threads have been shown no more than diagrammatically, if at all, on the pin and box fittings of the various figures as well as on other components, but are understood to be present and such threaded connections are well-known. The isolator further includes a drive dog housing 220 that engages each of pin housing end 200 and box housing end 210 with the drive dog housing electrically coupled to the pin housing in the overall assembly. The pin housing end, box housing end and drive dog housing in the present embodiment, as well as embodiments yet to be described, are generally formed from suitable high strength materials such as, for example, 4340, 4140, 4142 as well as 15-15HS or Monel K500 (wherein the latter two are non-magnetic high strength alloys), since these components are subjected to the potentially hostile downhole environment as well as relatively extreme force loads during an inground operation. Material selection can be based, at least in part, on the performance characteristics of typical drill pipe sections. Box end housing 210 includes an extension shaft 222 that supports a sealing ring 226 and a spacer ring 228 in a spaced apart relationship. The sealing ring and spacer ring are formed from a suitable electrically insulating material such as, for example, Delrin Acetal Copolymer, although any suitable material can be used. O-ring grooves 230 can be formed in the exterior surfaces, as seen, as well as the interior surfaces (shown in a figure yet to be described) of the sealing ring and spacer ring. In this regard, it should be appreciated that the isolator defines an overall through passage 232 such that a fluid such as drilling fluid or mud can transit through the isolator to flow through the drill string. Extension shaft 222 is receivable in the through passage of drive dog housing 220. An interior surface 238 (FIG. 3) of a free end of extension shaft 222 can be threaded to engage a threaded end 240 of a clamp nut 242 after installation of the extension shaft. The clamp nut defines a central passage 244 to provide for the flow of drilling fluid therethrough. Threads have not been illustrated on the clamp nut but are understood to be present. As will be see in a subsequent figure, the drive dog housing can define an endwall that confronts a shoulder 246 (FIG. 4) of the clamp nut. Thus, the clamp nut can draw extension shaft 222 into the through passage of the drive dog housing to retain the box end housing. The latter can include a peripheral flange 250 having a peripheral sidewall configuration 254 (FIG. 3) facing drive dog housing 220. A confronting end of the drive dog housing defines a peripheral endwall 260 (best seen in FIG. 4) and which will be further described below.

Figure 5:
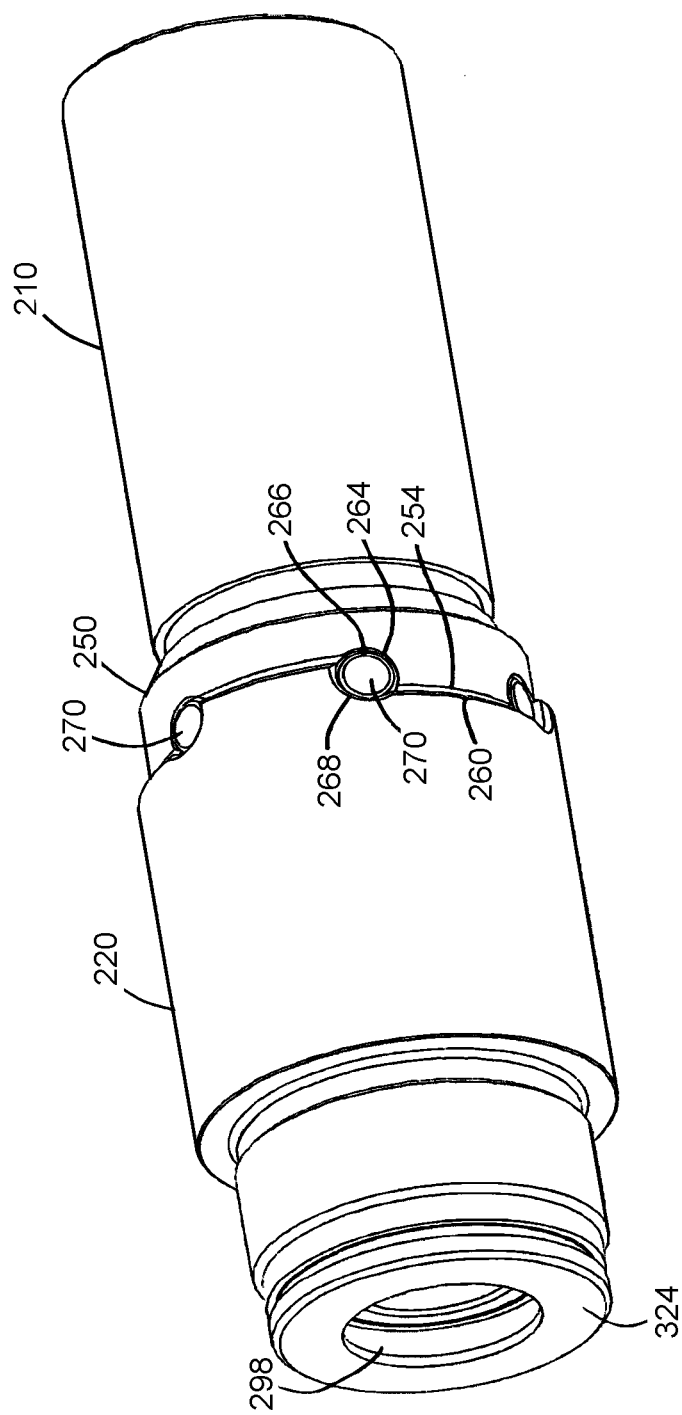
FIG. 5 is a diagrammatic partial view, in perspective, of selected components of the embodiment of the isolator of FIG. 2, shown here to illustrate these selected components in an assembled relationship.

Attention is now directed to FIG. 5 in conjunction with FIGS. 2-4. The former is a diagrammatic perspective view which illustrates box end housing 210 and drive dog housing 220 in an operational relationship such that peripheral sidewall configuration 254 of the box end housing is in a confronting relationship with peripheral endwall 260 of the drive dog housing. This confronting relationship serves to define a plurality of pockets 264 (one of which is designated) between opposing shoulders 266 and 268 of box end housing 210 and drive dog housing 220, respectively. In the present embodiment, shoulders 266 and 268 are at least generally cylindrical in configuration for purposes of capturing a group of electrical isolators 270 therebetween. Each isolator 270 includes a sidewall configuration that is complementary to the shape of shoulders 266 and 268 and is therefore cylindrical in the present embodiment. Further, each isolator 270 can include opposing end surfaces that can be at least generally planar. As seen in FIGS. 2 and 3, box end housing 210 provides a floor 274 for each pocket 264 such that an end surface of each isolator 270 is supported or captured against floor 274. With isolators arranged as shown in FIG. 5, a sleeve 280 (FIGS. 2-4) can be received on the box end housing such that tabs 282 (FIG. 2) project over an outward facing end surface of each isolator 270 to retain the isolators in their associated pockets. Sleeve 280 can be retained in position, for example, using a roll pin 286 that is receivable in an aperture 288 such that an intermediate portion of the roll pin is received in an annular groove.

Although not visible in the view of FIG. 5, it should be appreciated that clamp nut 242 is installed in a through passage 298 of the drive dog housing to engage extension 222 of the box end housing in a way that retains the drive dog housing and the box end housing in the illustrated operational relationship. Accordingly, isolators 270 are supported having their elongation axes extending at least generally radially with respect to the centerline or elongation axis of the overall assembly. As will be further discussed, the sidewalls of isolators 270, which are cylindrical in the present embodiment, are subjected to compressive force responsive to a push force 300 (indicated by an arrow in various figures) that is applied by the drill rig via the drill string. Likewise, rotation of the drill string applies compressive force to the sidewalls of isolators 270.

In view of the foregoing discussions, it should be appreciated that isolators 270 can be subjected to very high compressive loading. Accordingly, a suitable material is needed in order to endure such compression. Suitable materials can include ceramic materials that are either currently available or yet to be developed. By way of non-limiting example, one suitable ceramic material is toughened Zirconia. It is of interest that, while such ceramic materials are very resistant to compressive forces, they are not generally as well suited to tension loading. In the instance of toughened Zirconia, the compressive strength is approximately 270,000 to 700,000 pounds per square inch whereas the flexural strength is only approximately 58,000 to 90,000 pounds per square inch. For purposes of comparison, the flexural strength of high strength steel such as, for example, 4340 steel is approximately 175,000 pounds per square inch. It should already be appreciated that, while drive dog housing 220 and box end housing 210 apply compressive forces to isolators 270 responsive to both push and rotation of the drill string, the assembly is incapable of subjecting isolators 270 to tension, as will be further described.

Referring to FIGS. 2-5 and as described above, clamp nut 242 can be configured to threadingly engage extension 222 of box end housing 210. In doing so, the clamp nut is housed within through passage 298 (FIG. 5) of the drive dog housing. As seen in FIG. 4, shoulder 246 of clamp nut 242 defines a plurality of apertures 310, several of which are explicitly designated. Another group or set of isolators, several individual ones of which are designated by the reference number 320 (FIGS. 2 and 3), is supported with each one of this set of isolators received in a corresponding one of apertures 310 of the clamp nut. In the present embodiment, each isolator 320 can include at least generally planar end surfaces that are adjoined by a peripheral sidewall that can be cylindrical in configuration, although this is not a requirement. In an operational assembly, isolators 320 are captured between clamp nut 242 and an endwall 324 (FIG. 5) of drive dog housing 220 having an elongation axis of each isolator 320 at least generally in a parallel alignment with the elongation axis of the overall assembly. It should be appreciated that the outward end surfaces of isolators 320 are slidingly engaged against endwall 324. The discussions above with respect to material selection for isolators 270 is also applicable with respect to material selection for isolators 320. The latter can therefore be formed from suitable electrically insulating materials including ceramic materials that are either currently available or yet to be developed. By way of non-limiting example, one suitable ceramic material is toughened Zirconia. It should be appreciated, at this juncture, that isolators 320, like isolators 270, are not subjected to tensile forces during operation as a result of the manner in which they are supported by the isolator. Isolators 270 and 320 are not limited to the cylindrical configuration that has been illustrated. Any suitable shape can be utilized with appropriate modifications to support surfaces. Suitable shapes for use as isolators 270 can be selected from a wide range of geometric shapes such as, for example, spherical. Combinations of well known shapes can be used as well. Suitable shapes for use as isolators 270 can likewise be selected from a wide variety of well-known geometric shapes or combinations of such shapes generally so long as at least one generally flat surface is provided for engaging endface 324 of the drive dog housing. For example, isolators 270 can be spherical with the exception of a flat for purposes of engaging endface 324. During installation, clamp nut 242 can be torqued to a significant value such as, for example, 2500 foot-pounds to apply compressive force to isolators 320 as well as isolators 270 such that a compressive preload is applied to all of the isolators. The compressive preload is applied compressively to opposing ends of the drive dog housing and results in a preload tension force in extension 222 that is complementary to the compressive preload. In other words, the compressive preload attempts to stretch extension 222 responsive to the drive dog housing being compressed between peripheral flange 250 and clamp nut 242. The amount of compressive force, on an individual one of the electrical isolators can be based on the amount of retraction and/or thrust (push and/or pull) force that any given drill rig is capable of generating, as will be further discussed.

Referring to FIGS. 2-4, electrical cable 100 can be installed onto clamp nut 242 by receiving a fitting 340 into an aperture 342 that is defined by the clamp nut. In an embodiment, cable 100 can be a coaxial cable. An electrical conductor 344 of the cable can be clamped in position using a locking screw 346 which forms an electrical connection between conductor 344 and the clamp nut. Pin end housing 200 can then be installed onto drive dog housing 220 using threaded engagement with an end 348 of the drive dog housing and with cable 100 extending through the central passage of the pin end housing such that the drive dog housing and the pin end housing are in electrical contact, however, the clamp nut and box end housing are electrically isolated from the drive dog housing by sealing ring 226, spacer ring 228, isolators 270 and isolators 320. Accordingly, an electrically isolating break is formed in the drill string through the cooperation of these insulating elements. At the same time, the pin end housing can engage a downhole portion of the drill string and maintain electrical communication with the drive dog housing. Cable 100 can readily be accessed or replaced in the isolator by removing pin end housing 200.

Figure 6:
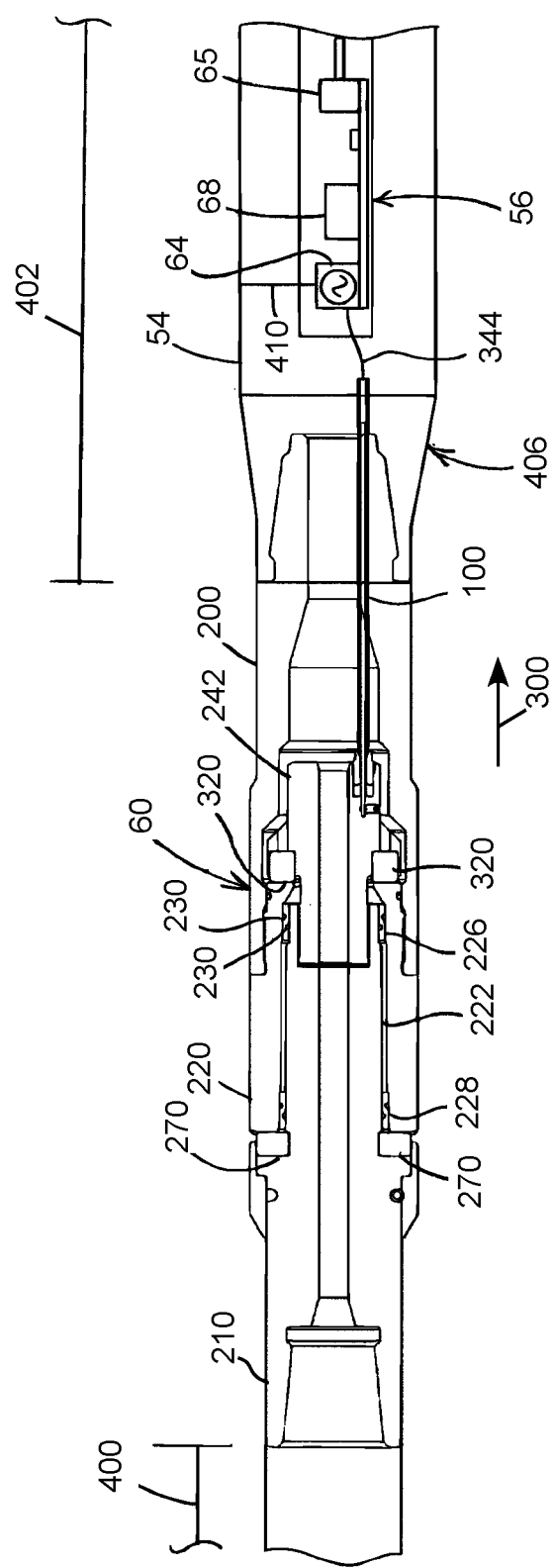
FIG. 6 is a diagrammatic cutaway view, in elevation, of the embodiment of the isolator of FIG. 2, shown here to illustrate further details of its structure.

FIG. 6 is a diagrammatic cut-away view, in elevation, that illustrates the present embodiment of isolator 60, as assembled, and installed as part of a drill string having an uphole portion 400 and a downhole portion 402. For purposes of this disclosure, the downhole portion of the drill string can comprise any suitable inground housing 406 such as a drill head housing and/or one or more intervening drill pipe sections (not shown) that connect isolator 60 to an inground housing 406. In the present example, the inground housing is a drill head or boring tool. Cable 100 can extend within the through passage of the drill string to electronics package 56 for electrical communication with drill string transceiver 64 via electrical conductor 344 of cable 100. As discussed above, drilling fluid can flow around the electronics package to reach an inground distal end of the drill string such as a drill head. Conductor 344 is electrically connected, at an opposing end, to a first terminal of transceiver 64 while a second, opposing terminal of the transceiver is electrically connected to the inground end of the drill string as diagrammatically indicated by a line 410. That is, line 410 is electrically connected to inground housing 54 in the present example which is representative of any suitable electrical connection to downhole portion 402 of the drill string. Accordingly, drill string transceiver 64, diagrammatically shown as a signal receiving and signal generating source, is electrically connected or bridged across an electrically isolating break or gap in the drill string, formed by inground isolator 60, such that uphole portion 400 serves as an electrical conductor that leads directly to the drill rig while downhole portion 402 provides a return path to the surrounding earth for the signal.

Having described isolator 60 in detail above with respect to its structure, attention is now directed to the method by which the isolator operates when in service as part of a drill string in terms of handling push, pull and rotational forces. Referring to FIG. 6, push force 300 is illustrated by an arrow. When the isolator receives such a push force from the uphole portion of the drill string, box end housing 210 initially receives the force which is immediately transferred to drive dog housing 220 by compressing isolators 270. As described above, drive dog housing 220 is coupled, for example, by threaded engagement directly to pin end housing 200 to transfer the push force to downhole portion 402 of the drill string. It is noted that push force 300 does not apply a compressive force to isolators 320 but rather actually decreases any compressive preload (if present) on these isolators that can be applied by clamp nut 242. During a pull force, opposite arrow 300, uphole portion 400 of the drill string pulls on box end housing 210 and on clamp nut 242 which is in threaded engagement with the box end housing. This results in isolators 320 being urged against end surface 324 (FIG. 5) of drive dog housing 220 such that the drive dog housing is forced in the uphole direction. At the same time, the pull force does not apply additional compressive force to isolators 270, but rather decreases compressive preload, if present. Because drive dog housing 220 is in threaded engagement with pin end housing 200, the latter also moves in the uphole direction which, therefore, pulls downhole portion 402 of the drill string in the uphole direction. Rotational torque from uphole portion 400 of the drill string is received by box end housing 210 in a way that results in compressing alternating ones of isolators 270 (see FIG. 5), as described above. Thus, a group of three isolators 270, which is less than the total number of six isolators 270, can be subject to the rotational torque. Threaded engagement between drive dog housing 220 and pin end housing 200 causes the latter to co-rotate with the drive dog housing which, in turn, rotates the downhole portion of the drill string. In any mode of operation, isolators 270 and 320 are not subject to tensile loading. Thus, the material characteristic of these isolators which is relevant to operation is compressive strength while tensile strength or lack thereof is essentially irrelevant.

Figure 7:
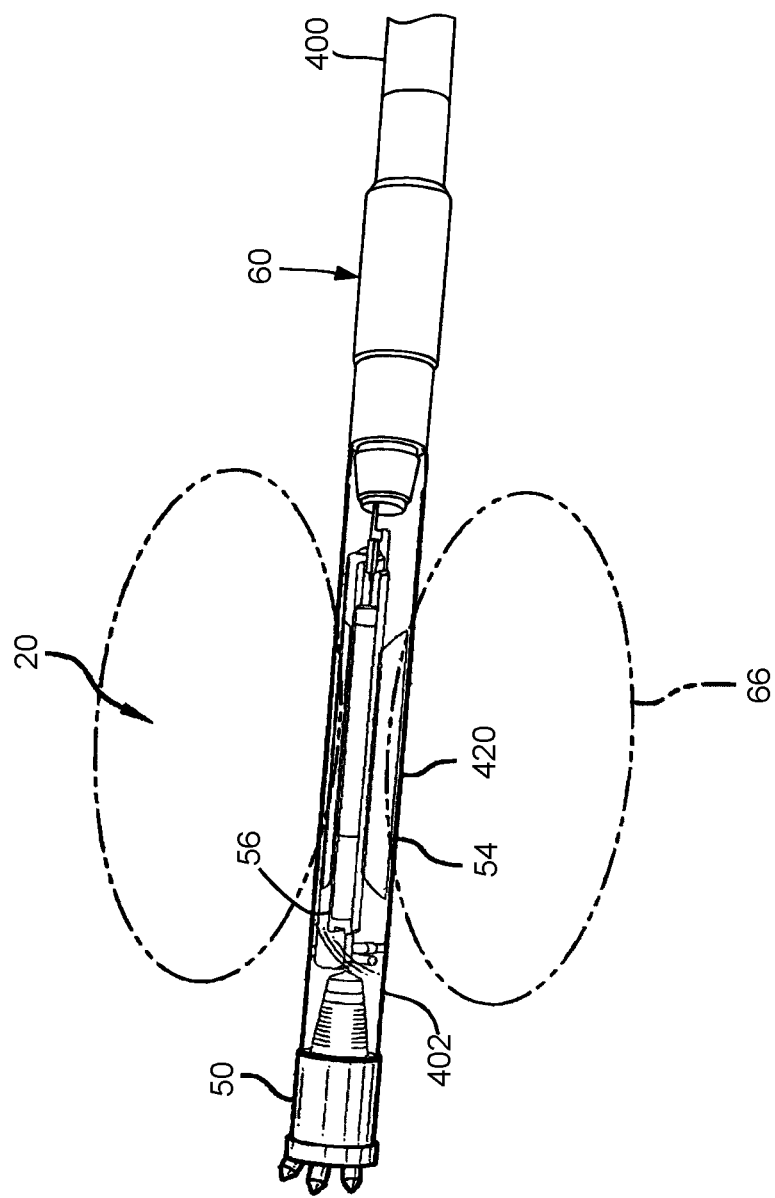
FIG. 7 is a diagrammatic view, in perspective, of a boring tool coupled to inground isolator of the present disclosure and with the inground isolator also connected to an uphole portion of a drill string.

FIG. 7 is a diagrammatic view, in perspective, which illustrates inground tool 20 in the form of a boring tool having drill head 50 for purposes of still further description. In this embodiment, inground housing 54 includes slots 420 for purposes of emitting signal 66 from transceiver 64 (FIG. 1). Isolator 60, serving as an example of a suitable embodiment, is removably attached to inground housing 54, comprising downhole portion 402 of the drill string, and which is itself removably attached to uphole portion 400 of the drill string.

Figure 8:
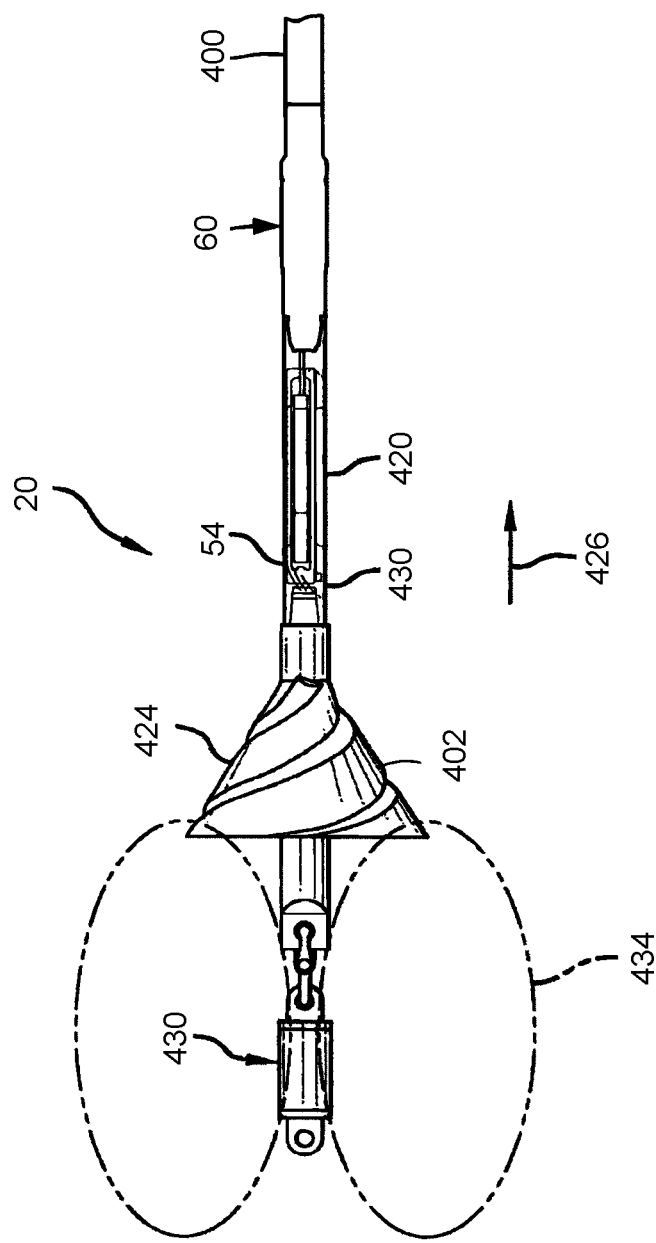
FIG. 8 is a diagrammatic view, in perspective, of an embodiment of a reaming tool arrangement that is removably attached to the inground isolator of the present disclosure, shown connected to an uphole portion of the drill string.

FIG. 8 is a diagrammatic view, in perspective, which illustrates inground tool 20 in the form of a reaming tool including a reamer 424 that is removably attached to one end of inground housing 54 to serve as downhole portion 402 of the drill string. Housing 54 and isolator 60 are otherwise provided in this embodiment in the same manner as in FIG. 7. The reaming tool is pulled in an uphole direction 426, which is indicated by an arrow, for purposes of enlarging a borehole as the reaming tool is pulled toward the drill rig by the drill string. An opposing end of the reaming tool is attached to one end of a tension monitoring arrangement 430. An opposing end of the tension monitoring arrangement can be attached to a utility (not shown) that is to be pulled through the enlarged borehole for installation of the utility in the borehole. Tension monitoring arrangement 430 measures the pull forces that are applied to the utility during the reaming operation. One suitable and highly advantageous tension monitoring arrangement is described in U.S. Pat. No. 5,961,252 which is commonly owned with the present application and incorporated herein by reference in its entirety. Tension monitoring arrangement 430 can transmit an electromagnetic signal 434 upon which tension monitoring and related/other data can be modulated. Signal 434 can be received by transceiver 65 (FIG. 1) such that corresponding data can be placed upon the drill string using isolator 60 for transmission to the drill rig. It should be appreciated that a wireless signal can be received from any form of inground tool by transceiver 65 and that the present embodiment, which describes a tension monitoring arrangement, is not intended as limiting. For example, a mapping arrangement can be used in another embodiment in place of the tension monitoring arrangement. Such a mapping arrangement can operate, for example, using an inertial navigation system (INS).

FIG. 9 is a block diagram which illustrates an embodiment of electronics section 56 in further detail. Section 56 can include an inground digital signal processor 510 which can facilitate all of the functionality of transceiver 64 of FIGS. 1 and 6. Sensor section 68 is electrically connected to digital signal processor 510 via an analog to digital converter (ADC) 512. Any suitable combination of sensors can be provided for a given application and can be selected, for example, from an accelerometer 520, a magnetometer 522, a temperature sensor 524 and a pressure sensor 526 which can sense the pressure of drilling fluid prior to being emitted from the drill string and/or within the annular region surrounding the downhole portion of the drill string. Isolator 60 is diagrammatically shown as separating uphole portion 400 of the drill string from downhole portion 402 of the drill string for use in one or both of a transmit mode, in which data is coupled onto the drill string, and a receive mode in which data is recovered from the drill string. The electronics section is connected across the electrically insulating/isolating break formed by the isolator by a first lead 528a and a second lead 528b which can be referred to collectively by the reference number 528. For the transmit mode, an antenna driver section 530 is used which is electrically connected between inground digital signal processor 510 and leads 528 to directly drive the drill string. Generally, the data that can be coupled into the drill string can be modulated using a frequency that is different from any frequency that is used to drive a dipole antenna 540 that can emit aforedescribed signal 66 (FIG. 1) in order to avoid interference. When antenna driver 530 is off, an On/Off Switcher (SW) 550 can selectively connect leads 528 to a band pass filter (BPF) 552 having a center frequency that corresponds to the center frequency of the data signal that is received from the drill string. BPF 552 is, in turn, connected to an analog to digital converter (ADC) 554 which is itself connected to digital signal processing section 510. Recovery of the modulated data in the digital signal processing section can be readily configured by one having ordinary skill in the art in view of the particular form of modulation that is employed.

Still referring to FIG. 9, dipole antenna 540 can be connected for use in one or both of a transmit mode, in which signal 66 is transmitted into the surrounding earth, and a receive mode in which an electromagnetic signal such as, for example, signal 434 of FIG. 8 is received. For the transmit mode, an antenna driver section 560 is used which is electrically connected between inground digital signal processor 510 and dipole antenna 540 to drive the antenna. Again, the frequency of signal 66 will generally be sufficiently different from the frequency of the drill string signal to avoid interference therebetween. When antenna driver 560 is off, an On/Off Switcher (SW) 570 can selectively connect dipole antenna 540 to a band pass filter (BPF) 572 having a center frequency that corresponds to the center frequency of the data signal that is received from the dipole antenna. BPF 572 is, in turn, connected to an analog to digital converter (ADC) 574 which is itself connected to digital signal processing section 510. Transceiver electronics for the digital signal processing section can be readily configured in many suitable embodiments by one having ordinary skill in the art in view of the particular form or forms of modulation employed and in view of this overall disclosure. The design show in FIG. 9 can be modified in any suitable manner in view of the teachings that have been brought to light herein.

Referring to FIGS. 1 and 10, the latter is a block diagram of components that can make up an embodiment of an aboveground transceiver arrangement, generally indicated by the reference number 600, that is coupled to drill string 16. An aboveground current transformer 602 is positioned, for example, on drill rig 14 for coupling and/or recovering signals to and/or from drill string 16. Current transformer 602 can be electrically connected for use in one or both of a transmit mode, in which data is modulated onto the drill string, and a receive mode in which modulated data is recovered from the drill string. A transceiver electronics package 606 is connected to the current transformer and can be battery powered. For the transmit mode, an antenna driver section 610 is used which is electrically connected between an aboveground digital signal processor 620 and current transformer 602 to drive the current transformer. Again, the data that can be coupled into the drill string can be modulated using a frequency that is different from the frequency that is used to drive dipole antenna 540 in inground housing 54 (FIG. 1) in order to avoid interference as well as being different from the frequency at which isolator 60 (FIG. 9) drives a signal onto the inground end of the drill string. When antenna driver 610 is off, an On/Off Switcher (SW) 620 can selectively connect current transformer 602 to a band pass filter (BPF) 622 having a center frequency that corresponds to the center frequency of the data signal that is received from the drill string. BPF 622 is, in turn, connected to an analog to digital converter (ADC) 630 which is itself connected to digital signal processing section 632. It should be appreciated that digital signal processing section 632 and related components can form part of processing arrangement 46 (shown using a dashed line) of the drill rig or be connected thereto on a suitable interface 634. Transceiver 606 can send commands to the inground tool for a variety of purposes such as, for example, to control transmission power, select a modulation frequency, change data format (e.g., lower the baud rate to increase decoding range) and the like. Transceiver electronics for the digital signal processing section can be readily configured in many suitable embodiments by one having ordinary skill in the art in view of the particular form or forms of modulation employed and in view of this overall disclosure.

Still referring to FIGS. 1 and 10, in a repeater embodiment, another inground isolator arrangement 640 (shown within a dashed box), can replace current transformer 602 along with another instance of inground housing 54. Arrangement 640 can include any suitable embodiment of inground isolator according to the present disclosure including another instance of isolator 60. The latter, in this arrangement, is connected to transceiver 606 (FIG. 10) and is inserted as a unit into one of the joints of the drill string to serve in the manner of a repeater, by way of example, 1000 feet from the inground tool. Thus, a section 400' of the drill string can connect the isolator to the drill rig while a section 402' of the drill string serves as an intermediate section of the drill string between isolator arrangement 640 and isolator 60 at the inground tool. The repeater unit can be inserted, for example, in the joint formed between drill pipe sections 1 and 2 in FIG. 1. The inground housing, for use in a repeater application, can include a box fitting at one end and a pin fitting at an opposing end. Of course, one of ordinary skill in the art will recognize that box to pin fitting adapters are well known and readily available. In another embodiment, isolator arrangement 640 can be inserted into a joint with the repeater electronics housed in a pressure barrel that can be supported by centralizers within the through passage of an adjacent drill pipe section. In yet another embodiment, the repeater electronics can be placed in an end loaded or side loaded housing and inserted into the drill string with electrical communication to the isolator. Such end or side loaded housings can include passages that allow for the flow of drilling fluid therethrough. In any of these embodiments, of course, the repeater electronics can be electrically connected to the isolator in a manner that is consistent with the descriptions above. In order to avoid signal interference and by way of non-limiting example, a repeater can pick up the signal originating from the inground tool or another repeater at one carrier frequency and the repeater electronics can retransmit the signal up the drill string at a different carrier frequency in order to render the signals distinguishable from one another. As another example, suitable modulation can be used to make the signals distinguishable. Thus, the repeater electronics package can be housed in any suitable manner in electrical communication with the signal coupling arrangement of the isolator for producing a repeater signal based on the received data signal, but which is distinguishable from the received data signal.

Attention is now directed to FIG. 11 which illustrates another embodiment of an inground isolator, in accordance with the present disclosure, generally indicated by the reference number 60', in a diagrammatic perspective view. It is noted that isolator 60' can be used in a manner that is identical to that of aforedescribed isolator 60. Like reference numbers have been applied to components and features that are shared by isolators 60 and 60'. In instances of the use of a modified component or feature, a prime (') mark has been appended to the previously applied reference number.

Referring collectively to FIGS. 11-13, details will now be provided with respect to embodiment 60' of the isolator. FIGS. 12 and 13 are exploded diagrammatic views, in perspective, taken from different angles in order to illustrate details of the present embodiment. As seen in FIG. 12, box end housing 210' includes a peripheral flange 250' having a peripheral sidewall configuration 254' which defines a plurality of recesses 700. In the present embodiment, each recess is defined as a concave spherical surface that is generally no more than one-half (a hemisphere) of an overall spherical outline. Each recess 700 is configured to partially receive one of a first plurality of electrical isolators 710, each electrical isolator being spherical in form in the present embodiment. As seen in FIG. 13, a peripheral endwall 260' of drive dog housing 220' defines a corresponding plurality of recesses 714 that can have the same shape as recesses 700. When isolator 60' is assembled, as in the view of FIG. 11, electrical isolators 710 are captured between drive dog housing 220' and box end housing 210' with each electrical isolator 710 partially received in one recess 700 and partially received in a cooperating and confronting recess 714. While twelve electrical isolators 710 and cooperating recesses are used in the present embodiment.

Still referring to FIGS. 11-13, a second plurality of electrical isolators 730 is positioned between an endface 324' of drive dog housing 220' (FIG. 12) and a support ring 734. In an embodiment, electrical isolators 730 can be identical to electrical isolators 710 although this is not required. In the present embodiment, eight electrical isolators 730 have been used, however, this is not a requirement and any suitable number of these electrical isolators can be used. Each electrical isolator 730 is partially receivable in one of a plurality of recesses 738, defined in endface 324', and partially receivable in one of a plurality of cooperating recesses 740 (FIG. 13), defined by support ring 734. The latter is itself received upon threaded end 240 of clamp nut 242' such that the support ring can rotate relative to the clamp nut. Assembly can be accomplished, by way of non-limiting example, by installing drive dog housing 220' on extension shaft 222 with sealing ring 226 and spacer ring 228 in place to capture electrical isolators 710 between the box end housing and the drive dog housing. Shaft 240 of clamp nut 242' can be installed through ring 734 and through the internal cavity of the drive dog housing such that the threads of threaded shaft 240 engage cooperating threads formed on interior surface 238 of box end housing 210' to capture electrical isolators 730 in confronting pairs of recesses 738 and 740 of the drive dog housing and support ring, respectively. Clamp nut 242' can then be torqued to a suitable value such as, for example, 2500 foot-pounds, by way of non-limiting example, to apply compressive force to electrical isolators 710 as well as electrical isolators 730 such that a compressive preload is applied to all of the electrical isolators. The amount of compressive preload force, on an individual one of the electrical isolators, can be based on the amount of retraction and/or thrust (push and/or pull) force that any given drill rig is capable of generating, as will be further discussed. The compressive preload is applied compressively to opposing ends of the drive dog housing and again results in a preload tension force in extension 222 that is complementary to the compressive preload. In other words, the compressive preload attempts to stretch extension 222 because drive dog housing 220' is compressed between peripheral flange 250' and clamp nut 242 via support ring 734. Cable 100 can then be installed using locking screw 346 and routed through the interior of pin end housing 200'. The pin end housing can then be torqued onto threaded end 348 of drive dog housing 220', although any suitable form of attachment can be used.

In view of the foregoing, drive dog housing 220' and pin end housing 200' are in electrical contact, however, clamp nut 242' and box end housing 210' are electrically isolated from drive dog housing 220' by sealing ring 226, spacer ring 228, electrical isolators 710 and electrical isolators 730. Accordingly, an electrically isolating break is formed in the drill string through the cooperation of these insulating elements. At the same time, the pin end housing can physically engage a downhole portion of the drill string and maintain electrical communication with the drive dog housing. Cable 100 can readily be accessed or replaced in the isolator by removing pin end housing 200'.

During operation, push force 300 can be applied in a direction that is indicated by an arrow. When isolator 60' receives such a push force from the uphole portion of the drill string, box end housing 210' initially receives the force which is immediately transferred to drive dog housing 220' by compressing electrical isolators 710. As described above, drive dog housing 220' is coupled, for example, by threaded engagement directly to pin end housing 200' to transfer the push force to downhole portion 402 (FIG. 6) of the drill string. As in embodiment 60 with respect to electrical isolators 274, push force 300 does not apply a compressive force to electrical isolators 730 but rather actually decreases any compressive preload on these electrical isolators that can be applied by clamp nut 242'. During a pull force, opposite arrow 300, uphole portion 400 of the drill string pulls on box end housing 210' and on clamp nut 242' which is in threaded engagement with the box end housing. This results in electrical isolators 730 being urged against end surface 324' (FIG. 12) of drive dog housing 220' by support ring 734 such that the drive dog housing is forced in the uphole direction. Because drive dog housing 220' is in threaded engagement with pin end housing 200', the latter also moves in the uphole direction which, therefore, pulls downhole portion 402 of the drill string in the uphole direction. Rotational torque from uphole portion 400 of the drill string, responsive to either direction of rotation, is received by box end housing 210' in a way that results in the application of flexural/shear stress to electrical isolators 710. On the other hand, electrical isolators 730 are not subject to such flexural/shear stress due to rotational torque at least for the reason that support ring 734 can rotate relative to clamp nut 242'.

As noted above, electrical isolators 710 and 730 can be formed from the same material or from different materials either currently available or yet to be developed. Further, in some embodiments, electrical isolators 710 can be formed from different materials than electrical isolators 730. Suitable materials, by way of non-limiting example, include silicon nitride and transformation toughened zirconia. Empirical testing performed by Applicants has demonstrated that an arrangement of only three spherical silicon nitride electrical isolators can be capable of withstanding three times the rated torque of a typical drill pipe section. In other embodiments, either or both groups of electrical isolators 710 and 730 can include peripheral outlines that can be other than spherical. In such embodiments, the recesses that capture the electrical isolators can include a complementary shape. By way of non-limiting example, other suitable shapes can comprise a wide range of geometric shapes including but not limited to elongated such as cylindrical and ortho-rectangular. Further, the layout of the electrical isolators can be changed in any suitable manner. With regard to layout, for example, concentric rings of electrical isolators can be provided.

Referring to FIG. 14, an inground tool, produced according to the present disclosure is shown in a cut-away diagrammatic perspective view and is generally indicated by the reference number 800. FIGS. 15 and 16 illustrate inground tool 800 in exploded perspective views for further illustrative purposes and are taken from appropriate perspectives to illustrate opposing ends of the various components. In the present embodiment, the inground tool is a drill head or bit into which electrical isolation has been integrated. In particular, a drillhead 804 can serve as the inground distal end of the drill string. The drill bit is located at one end of a drill housing 810 while an opposing end 814 can be configured to engage drive dog housing 220' in a manner that is consistent with the engagement between pin end fitting 200' and drive dog housing 220' of FIGS. 11-13. For example, opposing end 814 can threadingly engage the drive dog housing. Drill housing 810 can define a cavity for receiving a suitable electronics package such as, for example, previously described electronics package 56. The installed orientation and position of the electronics package can be established, for example, using a spring pin 812 (FIG. 15) that can pass through corresponding openings 814a and 814b in each of the drill housing and the electronics package, respectively. Cable 100 can be received by the electronics package, for example, by a pipe plug fitting 815 (FIGS. 15 and 16). A cover 816 can be held in position by fasteners 820 to provide for installation and removal of electronics 56. One or more slots 420 can provide for emitting signal 66 in a manner that is consistent with the descriptions above and/or for receiving an electromagnetic signal 824 (FIG. 14) from another source such as, for example, an above ground portable device. A mud channel 830 can conduct drilling mud past the electronics package for emission from drill bit 804 in any suitable manner.

In view of FIG. 14, another embodiment of an inground tool according to the present disclosure can be based on the configuration of inground tool 60 of FIGS. 3 and 4, utilizing cylindrical or other suitably shaped electrical isolators such as are seen in the subject figures. In particular, drill housing 810 of FIG. 14 can be affixed, for example, by threading engagement to threaded end 348 of drive dog housing 220 in FIGS. 3 and 4.

Referring to FIGS. 2, 11 and 14, it should be understood that an inground tool such as, for example, the drill housing of FIG. 14 can be installed in place of the pin housing in either FIGS. 2 and 11, thereby forming the basis of an interchangeable system. As part of this system, when opposing drill pipe fittings are provided on the inground isolators as seen in FIGS. 2 and 11, the apparatus can be inserted into any joint in the drill string between otherwise adjacent drill rods to form part of the overall length of the drill string. Associated electronics can be housed in any suitable manner either external to the inground isolator or internal thereto. For example, pin end housings 200 (FIG. 3) and 200' can be further elongated and configured to support any desired electronics package. Moreover, a selection of interchangeable fittings can be provided including but not limited to a drill pipe fitting including a pin end housing and/or a box end housing, a drill head and a reamer. Irrespective of the fitting that is used at any given time, it should be appreciated that the various components of these assemblies that cooperate to provide for electrical isolation can readily be accessed for maintenance and/or repair purposes.

Attention is now directed to FIGS. 17 and 18 which illustrate an inground tool system produced according to the present disclosure and generally indicated by the reference number 900. FIG. 17 is a diagrammatic assembly view, in perspective, and FIG. 18 is a diagrammatic exploded view, in perspective. The inground tool system, in the illustrated embodiment, supports a reamer 904 having a pull tab 908 at one end that can be used to pull a utility through the ground. Of course, a tension monitoring arrangement can be imposed between the reamer and the utility, for example, based on the embodiment of FIG. 8, as described above. Box end housing 210' and drive dog housing 220' can be used along with associated components such as, for example, electrical isolators 710 and 730 in a manner that is consistent with the descriptions above. In another embodiment, box end housing 210 and drive dog housing 220 of FIGS. 2-4 can be used along with associated components such as, for example, electrical isolators 270 and 320 in a manner that is consistent with the descriptions above relating to these figures. Accordingly, the reader is referred to the detailed discussions which appear above.

With continuing reference to FIGS. 17 and 18, an electronics housing 920 can be removably attached to a given embodiment of the drive dog housing that is in use such as, for example, drive dog housing 220'. Such attachment, for example, can be by way of threaded engagement or by way of any suitable mechanism. Housing 920 includes an elongated length and an opposing end 924 that defines a suitable fitting for engaging an inground tool such as, for example, reamer 904 to serve as an inground distal end of the drill string. In the present embodiment, opposing end 924 is a box end fitting and reamer 904 includes a pin end fitting 926. Housing 920 defines an interior cavity for receiving and supporting electronics package 56 in a manner that is consistent with the descriptions relating to FIGS. 14-15, although any suitable arrangement can be used. A cover 816' can be installed using a single fastener 820 since this cover defines a projecting 930 that is initially receivable within a cooperating feature of housing 920. Installation of fastener 820 then serves to maintain the cover in an installed position during inground operations. The flow of drilling fluid can be supported using a passage that can be formed in the manner, for example, of passage 830 of FIG. 14. It should be appreciated that reamer 904 can readily be replaced by a different inground tool such as, for example, drill bit 50 of FIG. 7.

The foregoing descriptions are not intended as being limiting with respect to the specific forms and/or combinations of housings and electrical isolators that have been utilized for purposes of forming an electrically isolating break or gap in the drill string. In this regard, any suitable modifications for purposes of forming an electrically isolating drill string gap are considered to be within the scope of the present disclosure so long as the teachings that have been brought to light herein are being practiced. Accordingly, embodiments of an interchangeable inground tool system have been provided which, in any of its various forms, facilitates communication using the drill string as an electrical conductor while maintaining robust mechanical performance characteristics that measure up to or can even exceed the performance characteristics of the drill rods themselves which make up the drill string. It is submitted that such a system, associated components and methods have not been seen heretofore. The present disclosure is submitted to sweep aside the limitations of prior art approaches that attempt to provide an electrically isolating break in the drill string by introducing what is, in effect, a weakened annular connection that is formed using an electrical insulator but which is nevertheless subject to full operational loading or other prior art approaches that attempt to use relatively thin layers of insulating/dielectric material that are subject to compromise by being worn through.

The foregoing description of the invention has been presented for purposes of illustration and description. It is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. An apparatus for use in combination with a drill string that is electrically conductive and extends from an inground distal end, that includes an inground tool, to a drill rig, said apparatus comprising:
   a first group of electrical isolators and a second group of electrical isolators; and
   a housing defining a through passage along a length thereof and configured to support the first and second groups of electrical isolators in a spaced apart relationship along the through passage and distributed therearound such that, responsive to the drill rig pushing on the drill string, no more than a first one of the first and second groups is subject to a compressive push force and responsive to the drill rig pulling on the drill string no more than the other one of the first and second groups is subject to a compressive pull force to form an electrically isolating break in the drill string.

2. The apparatus of claim 1 wherein said housing is configured such that, responsive to the drill rig pushing on the drill string, the first one of the first and second groups is subject to the compressive push force without subjecting the second group to the compressive push force and, responsive to the drill rig pulling on the drill string, the second one of the first and second groups is subject to the compressive pull force without subjecting the other one of the first and second groups to the compressive pull force.

3. The apparatus of claim 1 configured for insertion into the drill string to thereafter form part of an overall length of the drill string.

4. The apparatus of claim 1 configured to form part of said inground tool.

5. The apparatus of claim 1 configured to subject a selected one of the first and second groups of electrical isolators to an additional compressive force responsive to a rotational torque that is applied to the drill string by the drill rig.

6. The apparatus of claim 5 wherein only the selected one of the first and second groups is subject to said further additional compressive force.

7. The apparatus of claim 1 wherein the first group of electrical isolators and the second group of electrical isolators are formed from an identical material.

8. The apparatus of claim 1 wherein the first insulating members and the second insulating members are a ceramic material.

9. The apparatus of claim 8 wherein the ceramic material is selected as at least one of a toughened zirconia and a silicon nitride ceramic.

10. The apparatus of claim 1 wherein each electrical isolator is spherical in configuration.

11. The apparatus of claim 1 wherein said first group of electrical isolators comprises a plurality of elongated members and said housing captures the plurality of elongated members in a uniformly spaced apart distribution around a centerline of the housing.

12. The apparatus of claim 11 wherein each one of the plurality of elongated members is a cylindrical member defining an elongation axis and said housing supports each one of the plurality of cylindrical members having said elongation axis at least approximately parallel to said centerline.

13. The apparatus of claim 12 wherein each cylindrical member is formed having a solid core.

14. The apparatus of claim 12 wherein the plurality of cylindrical members is subject to said compressive pull force responsive to the drill rig pulling on the drill string.

15. The apparatus of claim 14 wherein said compressive pull force is applied to a pair of opposing end surfaces of each cylindrical member.

16. The apparatus of claim 12 wherein said housing supports six of said cylindrical members.

17. The apparatus of claim 1 wherein said second group of electrical isolators comprises a plurality of elongated members and said housing captures the plurality of elongated members in a uniformly spaced apart distribution around a centerline of the housing.

18. The apparatus of claim 17 wherein each one of the plurality of elongated members is a cylindrical member defining an elongation axis and said housing supports each one of the plurality of cylindrical members having said elongation axis extending at least approximately radially from said centerline.

19. The apparatus of claim 18 wherein the plurality of cylindrical members is subject to said compressive push force responsive to the drill rig pushing on the drill string.

20. The apparatus of claim 19 wherein said compressive force is applied to opposing side margins of a cylindrical sidewall of each cylindrical member.

* * * * *